United States Patent [19]

Kawamura et al.

[11] 4,093,992
[45] June 6, 1978

[54] ELECTRONIC WRISTWATCH

[75] Inventors: Yoshikazu Kawamura; Akio Shimoi; Yuichiro Iwai, all of Suwa, Japan

[73] Assignee: Kabushiki Kaisha Suwa Seikosha, Tokyo, Japan

[21] Appl. No.: 739,771

[22] Filed: Nov. 8, 1976

[30] Foreign Application Priority Data

Nov. 7, 1975   Japan ............................ 50-133717

[51] Int. Cl.² ................ G06F 7/48; G06F 15/02; G04B 19/30
[52] U.S. Cl. ............................ 364/705; 58/23 BA; 58/50 R; 58/152 R; 340/365 C; 364/709; 364/710
[58] Field of Search ............. 235/152, 156; 58/50 R, 58/152 R, 23 BA; 340/365 C

[56] References Cited

U.S. PATENT DOCUMENTS

| | | | |
|---|---|---|---|
| 3,813,533 | 5/1974 | Cone et al. | 58/50 R X |
| 3,855,461 | 12/1974 | Stockwell | 235/156 |
| 3,877,029 | 4/1975 | Larson et al. | 340/365 C |
| 3,898,790 | 8/1975 | Takamune et al. | 58/23 BA |
| 3,928,960 | 12/1975 | Reese | 58/152 R |
| 3,955,185 | 5/1976 | Nishimura | 235/156 X |
| 3,955,355 | 5/1976 | Luce | 235/156 X |
| 3,991,553 | 11/1976 | Bergey et al. | 58/23 BA |

Primary Examiner—Jerry Smith
Attorney, Agent, or Firm—Blum, Moscovitz, Friedman & Kaplan

[57] ABSTRACT

An electronic wristwatch having calculator circuitry operated by the time standard signals utilized to operate the timekeeping circuitry is provided. The electronic wristwatch includes a timing pulse generating circuit for producing a plurality of signals. Timekeeping circuitry is coupled to the timing pulse time standard signals produced thereby, for producing a plurality of timekeeping signals representive of actual time in response to at least one of the time standard signals being applied thereto. A digital display is provided for displaying actual time in response to at least some of the plurality of timekeeping signals being applied thereto. Calculator circuitry is provided for producing calculation signals representative of numerical information or a calculating function in response to receiving at least two of the time standard signals produced by the timing pulse generator means, the digital display being adapted to display the numerical information and calculating function in response to the calculating signals produced by the calculating circuitry being applied thereto.

37 Claims, 33 Drawing Figures

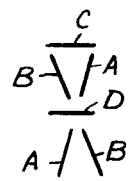 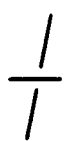 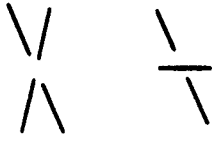 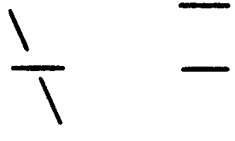
FIG.2a　　FIG.2b　FIG.2c　FIG.2d FIG.2e FIG.2f

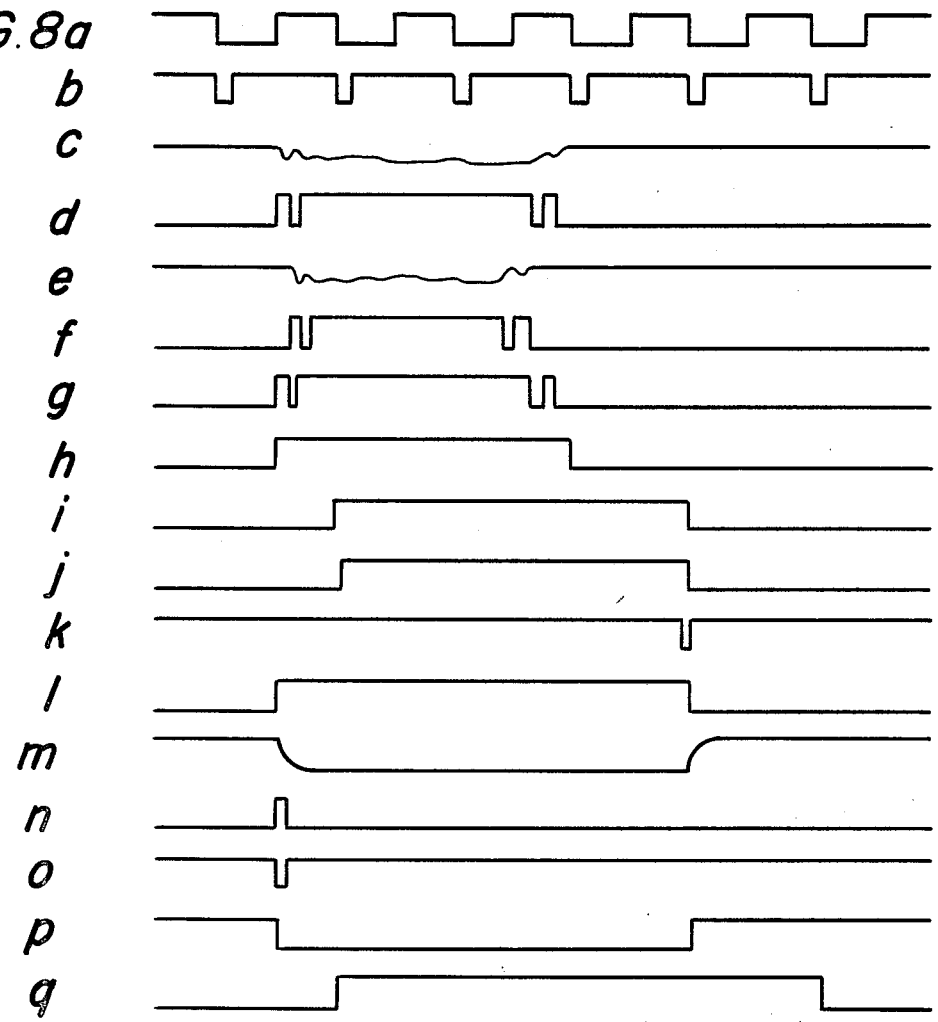

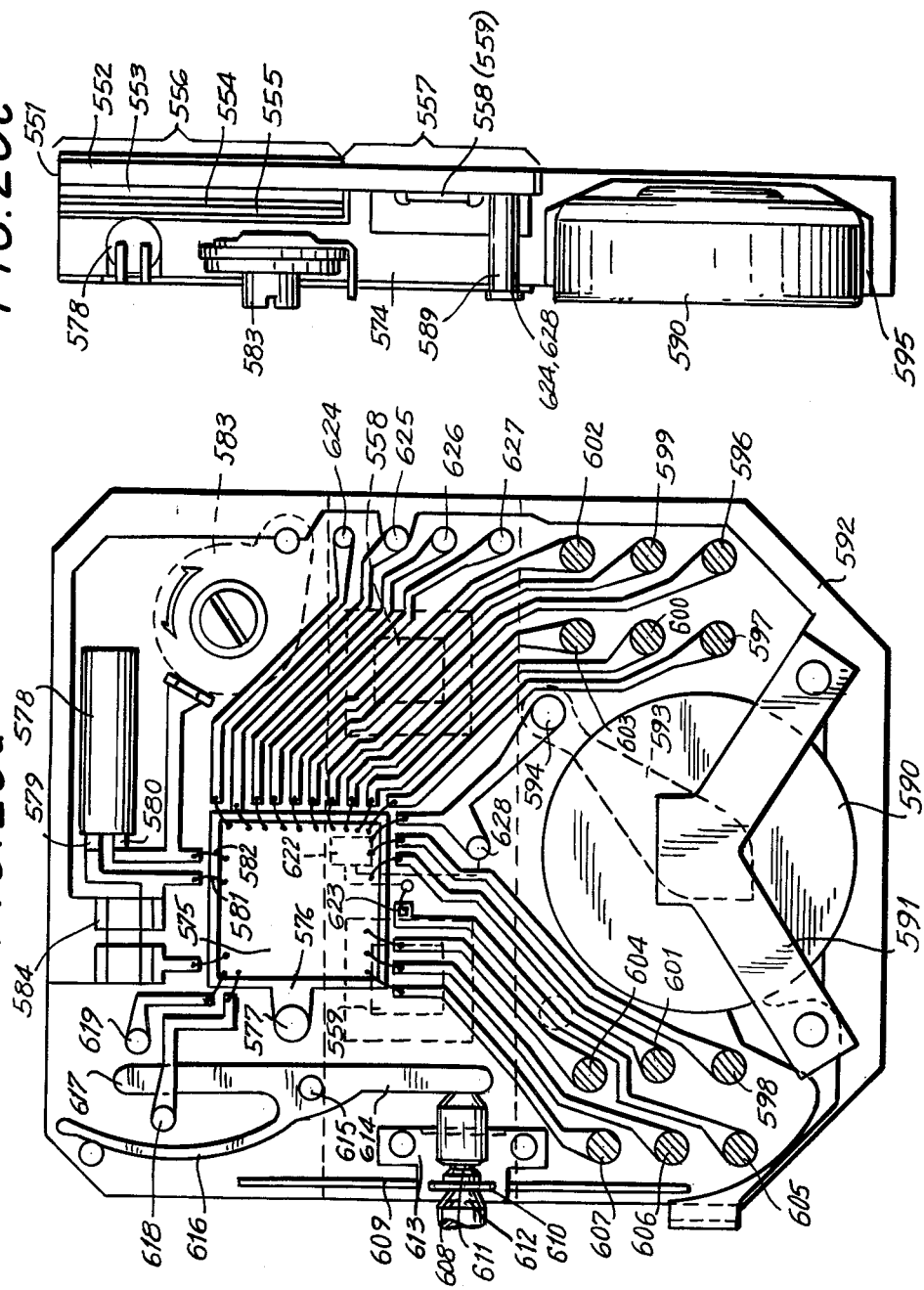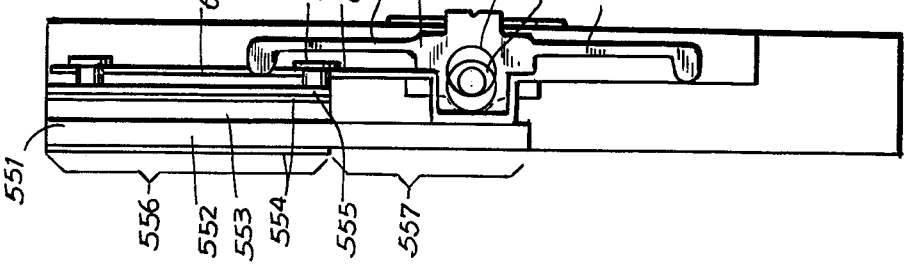

ELECTRONIC WRISTWATCH

BACKGROUND OF THE INVENTION

This invention is directed to an improved digital display electronic wristwatch, and in particular to an improved electronic wristwatch having a calculator circuitry that is operated by the time standard signals utilized to operate the timekeeping circuitry of the wristwatch.

The popularity of table size and hand held calculators has increased in recent years due to their portability. The utmost portability is obtained when a calculator is included in an electronic wristwatch. Nevertheless, efforts to include a calculator in an electronic wristwatch have been less than completely satisfactory due to the size of the electronic wristwatch and the manner in which the calculator circuitry has been added. Specifically, efforts to combine an electronic wristwatch with an electronic calculator have been directed at providing entirely independent timekeeping circuitry and calculator circuitry and only utilizing certain of the input switches to operate the respective timekeeping and calculator circuits, and further providing a single display for displaying either the timekeeping information or calculator information. In such an arrangement, no thought is given to the interrelationship between the respective circuits of the timekeeping circuitry and the calculator circuitry, which therefore prevents the elimination of particular circuits in the timekeeping circuitry and calculator circuitry that would permit further miniaturization of the electronic wristwatch. Accordingly, the electronic wristwatch of the instant invention is characterized by the common usage of many circuits for processing both calculator information and timekeeping information.

SUMMARY OF THE INVENTION

Generally speaking, in accordance with the invention, an improved electronic wristwatch having calculator circuitry operated by the time standard signals utilized to operate the timekeeping circuitry is provided. The electronic wristwatch includes timing pulse generating circuitry for producing a plurality of time standard signals and timekeeping divider circuitry for producing a plurality of timekeeping signals representative of actual time in response to at least one of the time standard signals being applied thereto. A digital display displays actual time in response to the timekeeping signals being applied thereto. Calculator circuitry is provided for producing calculator signals representative of either numerical information of a functional operation performed thereby in response to at least two of the time standard signals being applied thereto. The digital display is coupled to the calculator circuitry for displaying the numerical information and functional operation in response to the calculating signals being applied thereto.

Accordingly, it is an object of the instant invention to provide an improved electronic wristwatch having a calculator therein.

Another object of the instant invention is to provide an improved electronic wristwatch having calculator circuitry that is operated by the same frequency standard signals that are utilized to operate the timekeeping circuitry of the wristwatch.

Still another object of the instant invention is to reduce the power consumption in an electronic wristwatch having calculator circuitry so that a conventional battery (100 to 150 mAh) can be utilized to drive the electronic wristwatch for at least one year.

Still a further object of the instant invention is to provide an electronic wristwatch having calculator circuitry therein that is substantially the same size as a conventional electronic wristwatch.

Still another object of the instant invention is to provide an electronic wristwatch having calculator circuitry therein wherein the keys for inputing information into the calculator circuitry are easy to operate.

Still a further object of the instant invention is to provide a water resistant, shock resistant electronic wristwatch having calculator circuitry therein that additionally utilizes the timekeeping circuitry and calculator circuitry to provide other desired functions such as an alarm function, battery monitoring function, and the like.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 2a through 2f illustrate the respective conditions of a function display digit utilized in the digital display of the electronic timepiece depicted in FIG. 1;

FIG. 8 is a wave diagram illustrating the operation of the touch sensitive input circuit depicted in FIG. 7;

FIGS. 20a, 20b and 20c are plan and sectional side views, respectively, of the modular construction of an electronic wristwatch constructed in accordance with the instant invention;

DETAILED DESCRIPTION OF THE PREFERRED EMBODIMENTS

Figure 1:
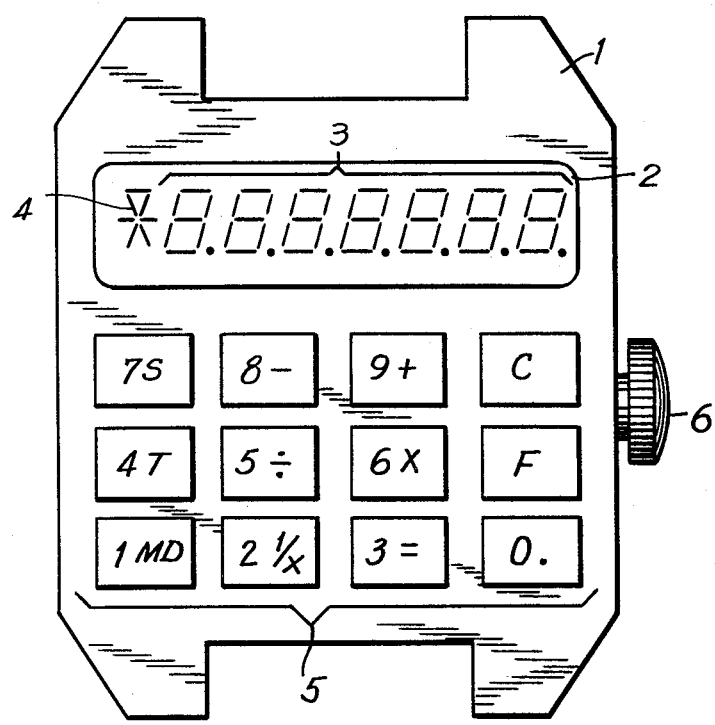
FIG. 1 is a plan view of an electronic wristwatch constructed in accordance with the instant invention.

Reference is now made to FIG. 1, wherein a digital display combination electronic wristwatch and electronic calculator constructed in accordance with the instant invention, is depicted. The wristwatch case 1 includes a liquid crystal display 2 formed of seven display digits 3, and a function display digit 4. The seven display digits 3 are formed in a conventional seven-segmented arrangement, with an eighth segment providing a decimal point. The function display digit 4 is provided for demonstrating when the calculator circuitry is performing a function and is described hereinafter in greater detail. The watch case 1 supports a plurality of input keys such as key/0./(the designation of a/☐/with a number therein being utilized hereinafter to designate one of the input keys 5 depicted in FIG. 1) used to provide inputs to the calculator circuitry, correction circuitry and the like. Finally, the watch case 1 supports a crown 6, which crown serves as a changeover switch for cyclicly selecting either a calculating mode of operation or a timekeeping mode of operation by pushing same in toward the watch case. Additionally, by pulling the crown 6 away from the watch case, time correction can be effected by utilizing the input keys in a manner to be discussed hereinafter. However, when the crown remains in its normal position, the position acts as a safety switch and prevents any inadvertent correction of the timekeeping circuitry and time displayed thereby.

It is noted that the keyboard 5 includes twelve keys. When the wristwatch is operating in a timekeeping mode, and a calculator mode is desired, the crown 6 is pushed in to thereby select a calculation mode. Thereafter, calculation is performed by utilizing the keyboard 5 to operate the calculator circuitry in a manner to be discussed in greater detail below. If however, the electronic wristwatch is operating in a timekeeping mode, and correction of the time displayed thereby is needed, such correction is obtained in the following manner. First, the crown 6 is pulled out from the watch case 1, thereby releasing the locking of the time correction feature. If the time is to be corrected to an actual time of 7:30, keys /0./ /7S/ /3=/ /0./ /F/ /4T/ are operated, in sequence, which sets the timekeeping circuitry to 7:30. Thereafter, if the digital display is coupled to the timekeeping circuitry, same will display hours, minutes and seconds, with the minutes and hours having been corrected in the manner described above. It is noted that when the key /1MD/ is operated and the electronic wristwatch is in a timekeeping mode, the month and date will be displayed by the digital display.

As noted above, if the crown is pushed in when the electronic wristwatch is in a timekeeping mode, the calculating mode will be selected. Thereafter, the respective calculating operations will be performed by utilizing the keys 5 to input numerical information to the calculator circuitry and to select the calculating functions to be performed thereby. In order to reduce the number of keys, a key is provided for each number 0 through 9, with the key having a second function, either calculating or timekeeping, to be performed in response to information being inputted thereby. Since each numerical key, in addition to inputting a number, can perform either a timekeeping or calculating function, the operation of the keys is considerably different than the operation of the keys in a keyboard found in a conventional electronic table calculator. In addition to the ten input keys having dual functions, a key /C/ is provided as a clearing key and a key /F/ is provided as the twelfth key and is the select key for selecting the functions performed by the ten keys having a number and function thereon. For example, if the key /F/ is actuated, and thereafter the key /6X/ is actuated, a multiplication operation is inputted to the calculator circuitry and hence, is performed thereby. Similarly, if the number 123 is to be multipled by the number 45 (123 × 45 = ?), such a multiplication operation is performed by operating keys /1MD/ /2!/×/ /3=/ /F/ /6×/ /4T/ /5÷/ /F/ /3=/ in sequence. Accordingly, when the wristwatch is operating in a calculating mode and the operating function, such as addition, subtraction, multiplication, division, equal and decimal point are required, actuation of the respective input keys must be preceded by the actuation of the /F/ key. Similarly, as noted above, when the wristwatch is in a timekeeping mode, and the hours and minutes displayed are to be corrected, after the correct hours and minutes are selected, the key /F/ followed by the key /4T/ are actuated. Similarly, when the seconds displayed are incorrect, correction thereof is effected by selecting the proper seconds count, and thereafter actuating keys /F/ and /7S/, in that order. Similarly, when the proper month and date is to be corrected, after the number and month of the date are selected, the keys /F/ and /1MD/ are selected, in that order. Since the calculator circuitry is provided in a watch case 1 that is the same size as a conventional electronic wristwatch, there is little room provided for the keys, thereby rendering it likely that the wrong key will be actuated or alternatively, that two keys will be actuated, thereby providing incorrect calculations thereby. Heretofore, electronic wristwatches that have inclined calculator circuitry therein have permitted the correctness of the numerical information applied to the calculator circuitry to be monitored by displaying the numerical information applied to the calculator circuitry. This is not however the case when the wrong function is selected. Accordingly, one feature of the instant invention is the provision of a function display digit 4. Display digit 4 is depicted in FIGS. 2a through 2f and is comprised of six segments forming a four bit function digit. Specifically, a first bit of information selects the segments A, a second bit selects the segments B, a third bit selects the segment C and a fourth bit selects the segment D. Accordingly, when the key /9+/ is actuated, after the key /F/, an addition function is performed by the calculating circuitry, if the calculating circuitry is disposed in a calculating mode. If such is the case, the segments energized by the bit A and the segment energized by the bit D will be lit and provide the display illustrated in FIG. 2b. FIGS. 2c, 2d, 2e and 2f respectively illustrate the selection of the subtraction, multiplication, division and equal functions to be performed by the calculator circuitry when same is in a calculating mode.

Figure 3:
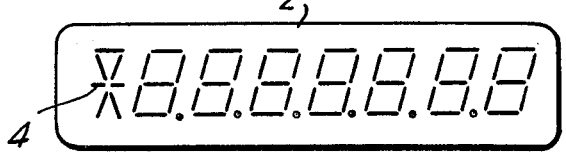
FIGS. 3, 4, 5 and 6 respectively illustrate the digital display of the electronic timepiece depicted in FIG. 1, with different display segments energized in accordance with the timekeeping or calculating function performed thereby.
Figure 4:
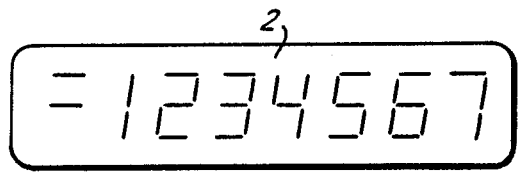

Reference is now made to FIG. 3, wherein the digital display 2 is illustrated as including seven seven-segment numerical display digits and the function display digit 4. Each of the seven display digits and the function display digit are utilized when the electronic wristwatch is disposed in a calculating mode. For example, in FIG. 4, the seven display digits are being utilized to display a seven digit number, and the function display digit 4 is displaying an equal function. It is noted that the greater the number of display digits utilized, the greater the accuracy of the calculator. Nevertheless, an increase in the number of display digits increases the number of display segments, and hence the number of connections in the electronic timepiece required. Accordingly, in order to insure reliability in the electronic wristwatch, it is advisable to keep the number of digits to a minimum. Moreover, since the amount of space in an electronic wristwatch is limited, the greater the number of display digits provided, the smaller must be the size of each individual display digit, thereby making it more difficult to read the display digit. In a preferred embodiment of the instant invention, seven display digits are utilized in order to optimize the display of calculating information and additionally the display of time.

Figure 5:
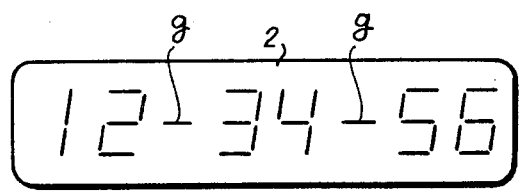
Figure 6:
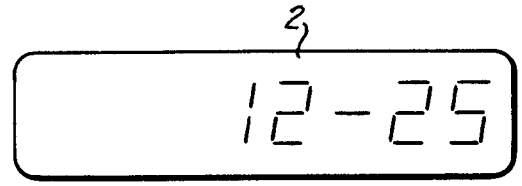

Reference is now made to FIGS. 5 and 6, wherein the digital display 2 respectively depicts the operation of the electronic wristwatch in a normal timekeeping mode, and in a date display mode. Specifically, in FIG. 5, the time illustrated is 12 hours, 34 minutes, 56 seconds. In order to clearly illustrate that hours, minutes and seconds is being displayed, single segment electrodes g between the respective hours and minutes and minutes and seconds are energized. Similarly, in FIG. 6, the date and month, to wit, December 25, are illustrated. It is noted that the function display digit 4 can be utilized as a ten hour display digit when the wristwatch is in a timekeeping mode of operation. Accordingly, by utilizing the seven display digits and a function display digit, the use of the wristwatch as a timekeeping instrument and as a calculator is optimized. Although the instant invention is not limited to the use of seven display digits and one function display digit, the aforenoted disadvantages inure to the increasing and/or decreasing of the number of display digits provided.

Turning now to the circuitry of the electronic wristwatch depicted in FIG. 1, the conventional push-button keyboard is replaced with touch sensitive input keys that utilize the inherent skin resistance of a human's body. Specifically, by utilizing touch sensitive switches, the absence of any moveable elements, and the reduction in the number of elements coupled with the improved water resistant qualities and reliability obtained, render such touch sensitive switches particularly suited for use in a miniaturized electronic wristwatch including the calculator.

Figure 7:
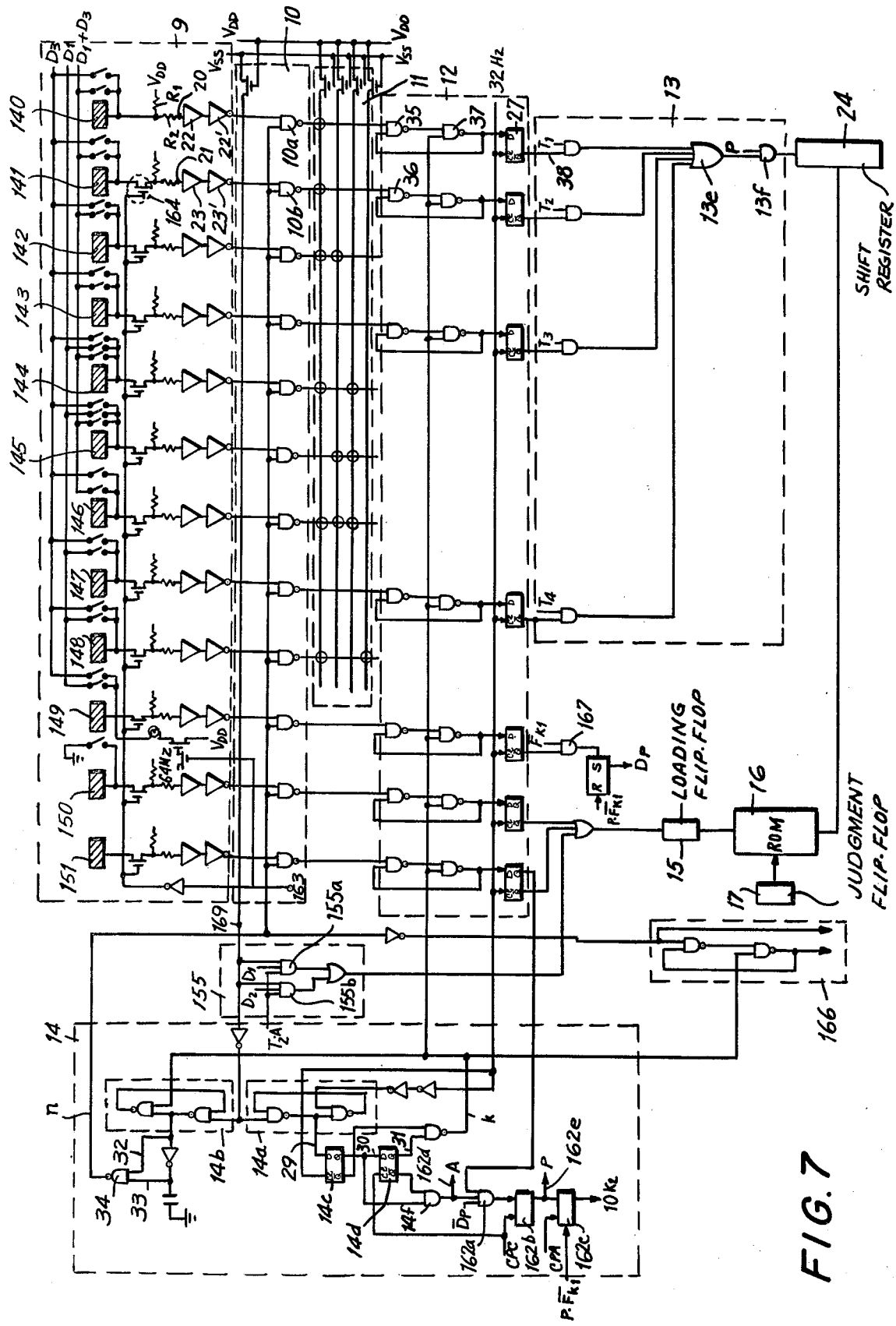
FIG. 7 is a block circuit diagram of a touch sensitive input circuit of the electronic wristwatch depited in FIG. 1.

When the touch sensitive input keys are utilized in a keyboard arrangement, such as that depicted in FIG. 1, each of the touch sensitive input keys are switched on by the touching of same with a finger to reference the plate potential to ground. However, because of the small space in which the respective input keys are located, considerable dexterity is required not to touch more than one key at a time, and thereby cause erroneous information to be applied to the calculator and/or electronic timepiece circuitry. Accordingly, when the wrong key or two keys are selected, the calculating registers must be cleared and thereafter the entire calculating operation must once again be commenced. Thus, in order to properly utilize the touch sensitive input keys, the application of multiple inputs to the calculator circuitry and/or electronic timepiece circuitry must be prevented. As is illustrated in FIG. 7, the instant invention is particularly characterized by circuitry for preventing multiple actuating signals from being produced by taking advantage of the fact that the area of contact between the finger and the key is maximized at the key that is to be selected and minimized at the surrounding keys. A touch sensitive input circuit 9 including a plurality of touch sensitive contacts 140 through 151 are coupled to an encoder circuit 10. The output of the encoder circuit 10 is coupled to an input control circuit 14 and through an OR circuit 11 to a multiple input prevention circuit 12. Multiple input prevention circuit 12 permits only the contact signal first detected by the detecting circuit 9 to be applied to the calculator circuitry. Thus, the multiple input prevention circuit 12 applies the earliest applied contact signal to a binary signal generating circuit 13, which circuit generates a four bit binary signal representative of a binary number and applies same to a shift register 24. The input control circuit 14 generates a one word cycle signal P once every period that information is to be read into the shift register 24, the signal P consisting of digits $D_1$ to $D_9$ and having a frequency, by way of example, of 448 Hz. Also, coupled to the shift register 24 is ROM 16, flip-flop 15 and judgment flip-flop 17, which circuits will be described in greater detail below with respect to FIG. 11.

By way of example, reference is made to touch sensitive contacts 140 and 141 in the touch sensitive detecting circuit, which touch sensitive contacts represent the keys /1MD/ and /2 1/x/ for reading into the shift register the binary equivalents of the numbers 1 (0001) and 2 (0010). Specifically, touch plate 140 represents the key for reading in the number 1 and touch plate 141 represents the key for reading in the number 2 in binary form to the shift register 24. In order to simplify the discussion herein, the remaining elements have not been numbered, and the specific example will be sufficient to characterize the instant invention.

Accordingly, a contact signal is produced in response to the touch sensitive contact 140 or 141 being referenced to a LOW potential by being touched. If it is intended to read in the number 1 in binary form to the shift register, the finger touches the touch sensitive contact 140. If only the touch sensitive contact 140 is touched, an actuating signal will be produced in the usual manner and thereby effect reading of a binary signal representative of the number 1 into the shift register 24. However, if in intending to input the number one into the shift register the touch plate 141 is also lightly touched when the finger firmly touches the touch sensitive plate 140, the contact area between the touch plate and the fingertip is greater at the touch plate 140 than it is at the touch plate 141. Accordingly, the finger resistance Rs is the touch plate 141 is higher than the finger resistance at the touch plate 140, thereby taking the potential seen at the input 20 of the inverter 22 a longer time to drop than the potential seen at the input 21 of the C-MOS inverter 23. Thus, as is illustrated in FIG. 8, the contact signal c produced by the touch sensitive contact 140 drops in its potential level earlier than the contact signal e produced by the touch sensitive contact 141.

Thereafter, the respective contact signals c and e are respectively applied to the inputs of the C-MOS inverters 22 and 23 and are shaped thereby and additionally by C-MOS inverters 22' and 23', respectively, to produce the shaped contact signals, illustrated as signals d and f in FIG. 8 at the outputs of the C-MOS inverters. The shaped signals d and f include the chatter signal components produced by the noise signal induced by the touched sensitive contacts. An OR connection joins the outputs of encoder circuit 10, whereby the signal g depicted in FIG. 8 is respectively applied as a set signal to the R-S flip-flop circuit 14a and the R-S flip-flop circuit 14b. The signal g commences the earliest of the outputs of encoder circuit 10 and continues to the end of the last of the outputs. At the same time that the signal g is applied to the R-S flip-flops 14a and 14b, the signal b illustrated in FIG. 10, having, by way of example, a 32 Hz frequency and synchronized by clock signal a, is applied as the reset signal to the R-S flip-flop circuit 14a. R-S flip-flop circuit 14a operates as a chatter eliminating circuit. Specifically, by selecting the period of the reset signal to be greater than the period of the chatter and external noise signals, all such chatter and noise signals are removed, as shown by the signal h produced at the output 29 of the flip-flop.

Figure 10:
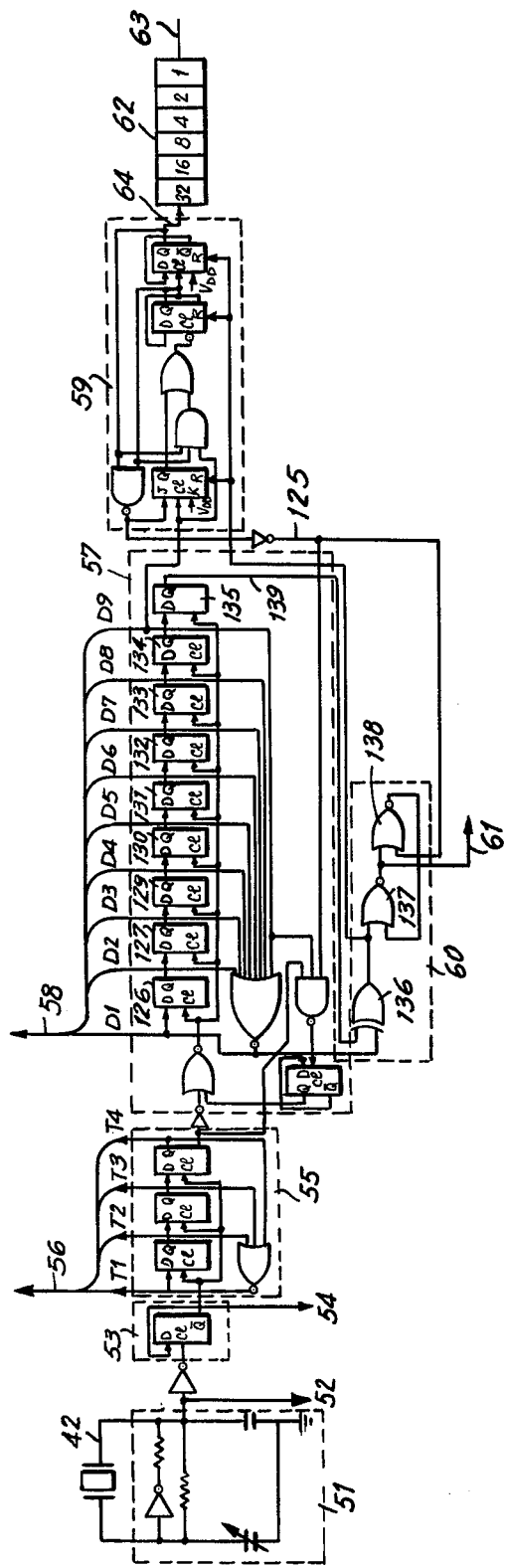
FIG. 10 is a detailed circuit diagram of the timing pulse generator circuitry depicted in FIG. 9.

Accordingly, the output 29 of the R-S flip-flop 14a is applied to the D terminal of D-flip-flop 14c, which produces a Q output 30 in response to the leading edge of the 32Hz signal b applied to the clear terminal thereof, output 30 being illustrated as signal i in FIG. 10. It is noted that signal i in FIG. 10 is a contact signal with the chatter eliminated therefrom.

The Q output 30 of the D flip-flop 14c is in turn applied to the D input of D-flip-flop 14d to produce a Q output 31, (signal j of FIG. 8), which is delayed by one word (by way of example, 448 Hz) when compared with the signal i applied thereto. The Q output 31 of D flip-flop 14d is compared with the $\overline{Q}$ output of D flip-flop 14c in a NAND gate 31a, which NAND gate produces an output signal k representative of the one-word delay. Signal k is a CPC signal characterized by a pulse generated once each word and is utilized to apply a reset signal to the reset inputs of the R-S flip-flops of the multiple output prevention circuit 12. Additionally, a one-word signal P is generated in response to the signal produced at the $\overline{Q}$ terminal of the D-flip-flop 14d. Specifically, the $\overline{Q}$ output of D flip-flop 14d and the Q output of the D-flip-flor 14c are applied to AND gate 14f. The output of AND gate 14f is applied as one of the inputs to AND gate 162a, the other input to the AND gate 162a being the signal $P \cdot \overline{F}_{k1}$. The signal $P \cdot \overline{F}_{k1}$ represents the output of the R-S flip-flops of circuit 12 associated with the F (function) selecting key, represented by plate 151 and an $F_{k1}$ signal. In this manner, when the F (function) key 151 and the decimal point key, represented by plate 150, are touched, the generating of the signal P is inhibited by AND gate 162a. The signal $F_{k1}$ is a signal referenced to a HIGH binary state or a LOW binary state by inputting the F input key.

The output of gate 162 is applied as the D input to flip-flop 162b, said flip-flop being cleared by a CPC signal. Signal P is produced at the Q output of flip-flop 162b and is applied as the D input to flip-flop 162c which is cleared by a CPA signal defined as follows:

$$CPA = CPC \cdot P$$

Flip-flop 162c is reset by a signal $\overline{P \cdot F_{k1}}$ and produces a Q output 10k2.

The signal applied at the output 169 of the OR connection is inverted and applied to R-S flip-flop 14b as a set signal, the reset signal of the flip-flop being the output of the NAND gate 31a. A capacitor is provided between the output $\overline{Q}$ of the R-S flip-flop 14b and the ground so that the $\overline{Q}$ output 32 is delayed relative to the Q output 33 of the flip-flop, as illustrated respectively by signals m and 1 in FIG. 8, so that the application of the Q and $\overline{Q}$ signals to the AND gate 34 produces a signal n at the output thereof, corresponding to the signal n in FIG. 8. The output signal n consists of a short pulse occurring once for each actuation of one or more touch sensitive contacts and is coincident with the beginning of the earliest signals d and f representative of the actuation of the first actuated contact. Output signal n is applied to the first input of each of the NAND gates 10a and 10b, the second input of NAND gates 10a and 10b being from the associated one of inverters 22', 23'. The output 35 of NAND gate 10a is shown by signal o of FIG. 10, while the output 35 of FIG. 10 of NAND gate 10b is held at a HIGH voltage level so as not to set the R-S flip-flop coupled thereto.

Specifically, only the contact signal produced by the touch plate 140 is detected coincident with the signal m to set the R-S flip-flop comprised of NAND gates 35 and 37, whereas the contact signal produced by the touch plate 141 is prevented from being applied to the R-S flip-flop associated therewith. Thus, the multiple input prevention circuit permits detection of the first applied contact signal and utilizes same to inhibit the remaining inputs such as the signal e in FIG. 10. Thereafter, the output of the NAND gate 37, of the R-S flip-flop formed thereby, which signal is illustrated as signal p in FIG. 8, is applied to the input 38 of an AND gate also having as an input binary timing signal $P_1$ representative of a count of 0001, which signals are then applied through the OR gate 13e to AND gate 13f. In this manner, each signal is transmitted to the shift register 24 by word signal P. Only the respective timing signals T1, T2, T3 and/or T4 associated with the contact first touched are inputted to the shift register. Thus, each of the contact signals produced by the respective touch sensitive contacts perform in the manner described above so that, for example, if the contacts 142, 144, 149, corresponding to the numbers 3, 5, 9 are touched by mistake, when it is only intended to touch the contact 145 corresponding to the number 6, to thereby input the number 6 to the circuitry, only the 0110 signal representative of the number 6 is transmitted to the shift register 24. Function control and decimal inputs are controlled in like manner, but are applied directly to ROM 16 through flip-flop 15 in a manner which will be discussed more particularly below.

It is noted that the drop in the voltage at the input to the C-MOS inverter is caused by the touch sensitive contact being engaged by a finger to thereby place the resistance between the ground and finger, to wit, the skin resistance of the human body, referred to hereinafter as $R_S$, in series with the resistor $R_1$ between ground and $V_{DD}$. Accordingly, the voltage seen at the input A of the C-MOS inverter 22, when a finger touches the touch sensitive contact 140 equals:

$$(R_S/R_S + R_1) \cdot V_{DD}$$

Thus, when $R_S$ is much less than $R_1$, the voltage at the input of the C-MOS inverter approaches 0.0 volts. Although the actual skin resistance $R_S$ differes depending upon the individual, such skin resistances are usually on the order of 10 MΩ or less. Accordingly, if the magnitude of the resistance $R_1$ is predetermined to be on the order of 22 MΩ, by way of example, a sufficient drop in the voltage seen at the input 20 of the inverter can be utilized in the manner described above. Moreover, if it is not desired to utilize the skin resistance, piezoelectric elements can replace the touch sensitive contacts, with the same overlap prevention circuit insuring that only the first key contacted applies an input signal to the shift register, or other calculator circuitry.

Figure 9C:
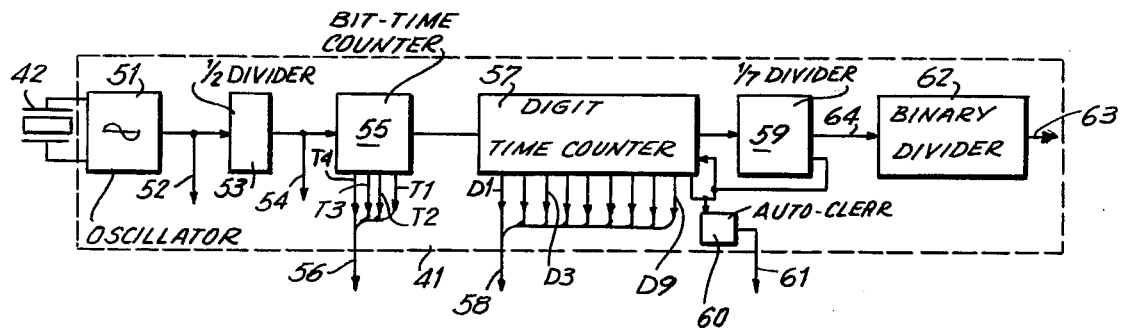
FIG. 9C is a circuit diagram of a timing pulse generator constructed in accordance with the instant invention.
Figure 9A:
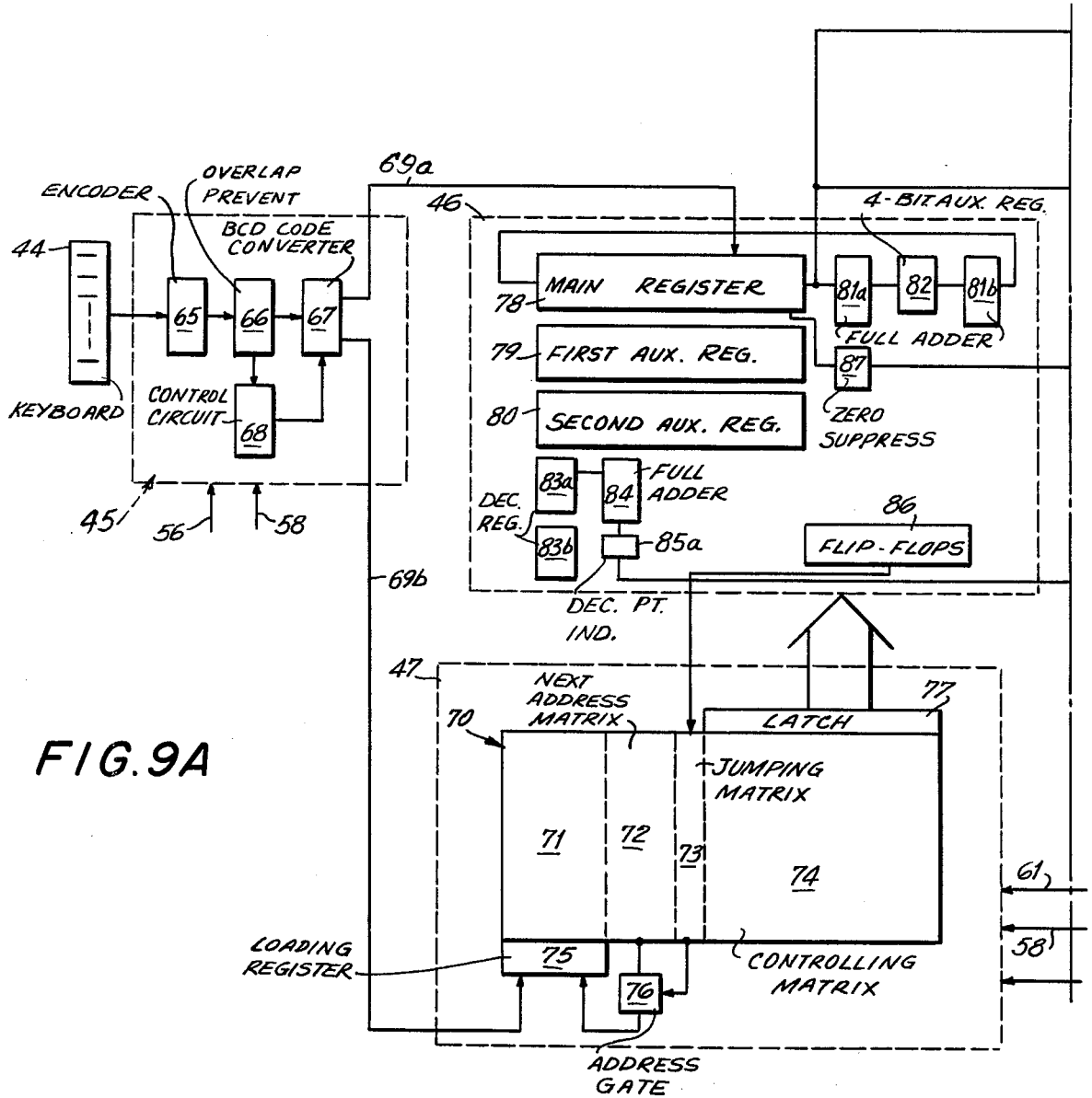
FIGS. 9A and 9B are a composite block circuit diagram of an electronic timepiece having calculator circuitry constructed in accordance with a preferred embodiment of the instant invention.
Figure 9B:
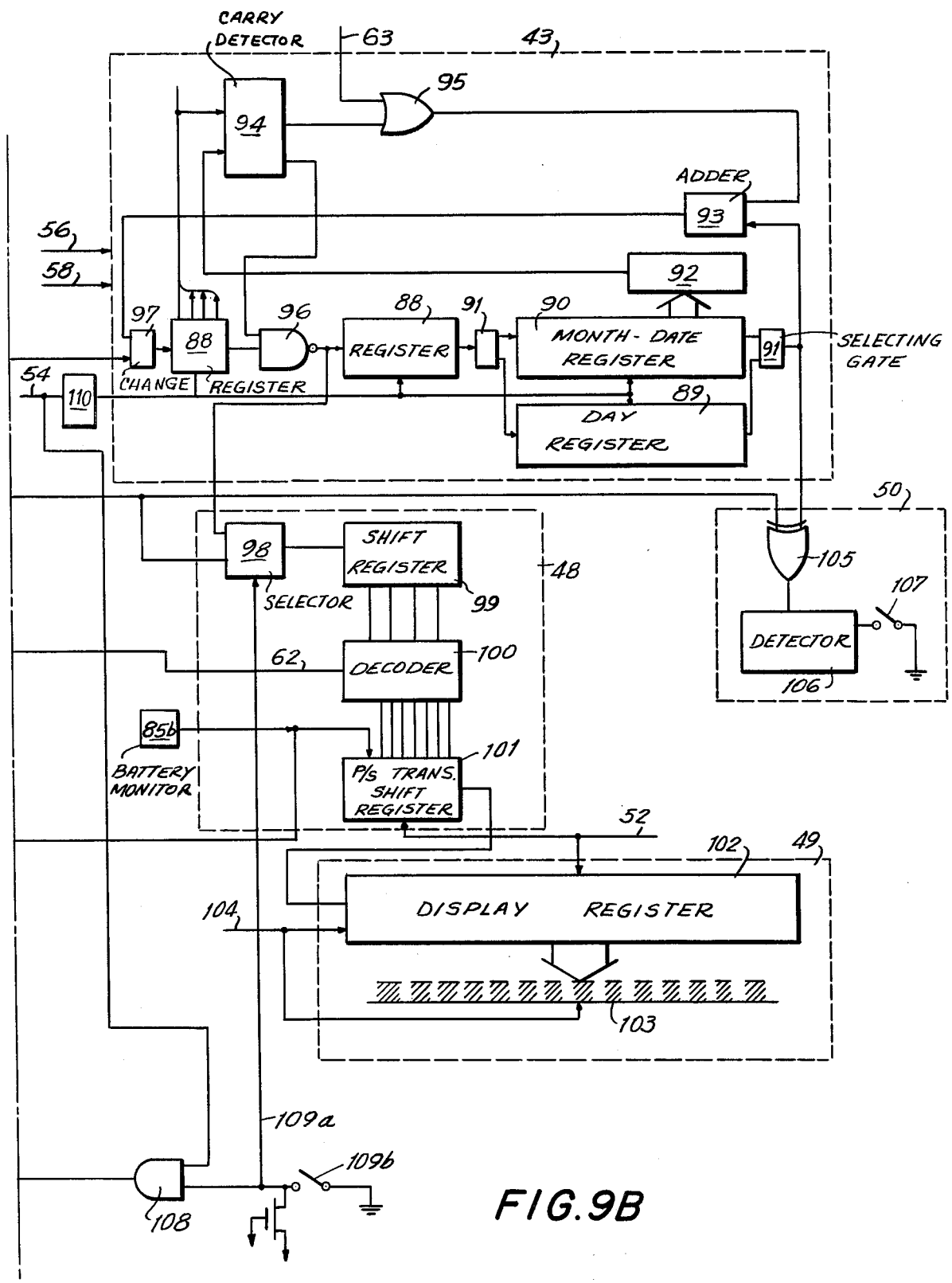

Reference is now made to FIGS. 9A and 9B, wherein a block circuit diagram of an electronic wristwatch having timekeeping circuitry and calculating circuitry, both defining integral and interrelated elements of the electronic wristwatch for the purpose of providing a minimum power consumption, is depicted. As depicted in FIG. 9C, timing pulse generator circuit, generally indicated as 41, which circuit is illustrated in detail in FIG. 10, includes a quartz crystal vibrator as a time standard. A timekeeping circuit, generally indicated as 43, is adapted to receive a low frequency signal produced by the timing pulse generator circuit 41 and produce timekeeping signals representative of seconds, minutes, hours, AM, PM, day, date and the month. Timekeeping circuitry is illustrated in detail in FIG. 14.

A keyboard 44 is coupled to an input circuit 45, which input circuit is illustrated in detail in FIG. 11. The input circuit is adapted to apply either a numerical output or function output to the calculating circuitry, generally indicated as 46, the calculating circuit including a calculating register, decimal point register and a full adder. The calculating circuit 46 is illustrated in detail in FIG. 12. The function output produced by the input circuit is applied to a ROM circuit, generally indicated as 47, which circuit controls the sequence of operations of the calculating circuit, and is illustrated in detail in FIG. 13. A decoder circuit, generally indicated as 48, is adapted to receive calculation information from the calculator circuit 46 and timekeeping information from the timekeeping circuit 43 and in response thereto decode same and apply the information to an LC display 49. The decoder circuit 48 is illustrated in detail in FIG. 16. Finally, an alarm circuit 50 is coupled to the calculating circuitry 46 and timekeeping circuitry 43 in order to detect the respective signals therefrom and provide an alarm signal, the alarm circuit being illustrated in detail in FIG. 15.

The timing pulse generator circuit 41 includes an oscillator circuit 51 having, as a time standard, a quartz crystal vibrator 42. The quartz crystal vibrator has a natural frequency of vibration of $2^n$ Hz (such as 32, 768 Hz or 524, 288 Hz) with the frequency being in the range of 30 KHz to 600 KHz. By utilizing a frequency of $2^n$ Hz, the accuracy of the timekeeping operation can be assured.

The quartz crystal vibrator 42 is preferably a tuning fork quartz crystal vibrator of the free-free-bar flexural mode or longitudinal-vibration mode. The oscillator circuit 51 is a conventional oscillator circuit including a barium titanite capacitor, thermistor varistor, or the like, for providing sufficient temperature compensation. The high frequency time standard signal 52 produced by the oscillator circuit 51 is applied to a one-half divider 53, which divider in turn applies a 16, 384 Hz ($2^{15}$) signal 54 to a bit-time counter 55. The bit-time counter 55 in response to the signal 54 generates bit signals ($T_1$, $T_2$, $T_3$ and $T_4$) designated as 56. Coupled to the bit-time counter 55 is a digit time counter 57, which counter generates digit signals ($D_1$ to $D_9$) indicated as signal 58. Digit signals $D_1$ through $D_9$ are utilized by the display circuitry for the eight display digits. A 1/7 divider 59 is coupled to the output of the digit time counter 57 and in response to the signals applied thereby produces an output signal 64 having a frequency of 64 Hz. In order to produce a low frequency timekeeping signal having a period of one second, signal 64 is applied to a six-stage binary divider 62, which divider produces a low frequency time standard signal having a frequency of 1 Hz. An autoclear circuit 60 is coupled to the digit time counter 57 and is utilized to clear the register by resetting same to zero when the power is turned on. It is noted that the clock signal 54 produced by the ½ divider 53 is utilized as the transfer signal for transferring the BCD-coded data in the calculating circuit registers, timekeeping circuit registers and display circuit registers.

The keyboard 44 includes a plurality of touch sensitive contacts 140 through 151 (illustrated in detail in FIGS. 7 and 11) and arranged in the configuration depicted in FIG. 1. As noted above, by utilizing the touch sensitive contacts in the keyboard 5, a small sized, completely water-resistant combination quartz crystal wristwatch and calculator is provided. The keyboard 44 is coupled to the input circuit 45 and applies the signals to encoder 65, which encoder in turn applies the BCD-coded signals to an overlap prevent circuit 66, which circuit detects the earliest input signal and prevents the other input signals, inadvertently applied by touching contacts surrounding the desired contact, from being applied to the calculator circuitry, in the manner discussed above. The BCD-coded signals are applied to bit-serial BCD code converter 67 and to control circuit 68, which circuit controls the BCD code converter. Accordingly, the BCD code converter is adapted to apply a numerical output signal 69a to the calculating circuit 46, or alternatively, a function output signal 69b to the ROM circuit 47 to thereby select an address at which the respective calculating operation is to be effected.

ROM circuit 47 includes an address register 75, which register is adapted to receive the function output signal 69b produced by the input circuit, and in response thereto select an address at which the calculation is to be effected. ROM 70 is comprised of a plurality of matrixes including an address matrix 71, a next-address selecting matrix 72, a jumping matrix 73 and a control matrix 74. The ROM matrixes 70 are permanently programmed in order to provide a predetermined order or sequence of calculations, a specific method of setting the alarm, and a predetermined manner of correcting the time, which methods do not vary once the ROM matrixes have been programmed. An address gate 76 is coupled to the jumping matrix 73 and is coupled to the address matrix and next address matrix to effect a jumping of the matrixes. The time required to address the ROM matrix is the time of a single word signal. Nevertheless, since the ROM is composed of MOS-FET transistors, the operation of the address registers through a single word causes an increase in power consumption. In order to minimize the power, latch circuits 77 corresponding to each bit of the ROM matrix are provided, for holding this information so that it is only necessary to operate the ROM when an address is changed thereby. Accordingly, by utilizing the latch circuits 77, a considerable reduction in power results. It is noted that the ROM circuitry includes a sufficient number of MOS transistors that utilize a considerable portion of the integrated circuit. Accordingly, the less time that is required to operate same, the less drain on the battery will result.

If, instead of producing a function output signal 67b, the input circuitry produces a numerical output signal 69a, which signal is applied to the main register 78 of the calculating circuit 46. The calculating circuit 46 includes the main register 78 for storing numerical information, calculation results, time correction information, alarm time information, and the like. First auxiliary register 79 and second auxiliary register 80 are half-delay type static registers and are utilized as calculation assisting registers. Disposed between full adders 81a and 81b is a four bit auxiliary register 82, the full adders, auxiliary register and main register 78 providing a cyclical loading feature to the main register 78. Additionally, the calculating circuit 46 includes decimal point registers 83a and 83b. Decimal point register 83a is coupled to a full adder 84, which adder in turn is coupled through a decimal point indicating circuit 85a to the decoder circuit 48. A group of judging flip-flops for judging the state of each register during calculation is coupled to the jump matrix 73 of the ROM circuit.

Since each register is a half-delay type static register, only the selected register is operated when data is to be transferred to perform a calculating operation, thereby preventing the mere circulation of data in the remaining registers. Moreover, the decoder circuit 48 receives the data to be displayed only when the data stored in the selected register is changed. For example, only after numerical information is transferred into a register, or a calculation is effected in a register, is the information read into the decoder. By decreasing the transfer of data in the respective shift registers, and by utilizing a zero-suppress circuit 87 of the memory type, discussed in greater detail below, the power consumption of the calculator circuit is considerably decreased. Also, the number of circuit elements is reduced since half-delay type registers are utilized. It is noted that the registers 78, 79 and 80 are constructed to process both seven and eight digit information and are changed over when necessary.

In addition to the registers included in the calculating circuit, the timekeeping circuit 43 includes half-delay type static shift registers 88 and 89 for storing timekeeping data applied thereto every second by an adder 93. Specifically, the one-second low frequency timekeeping signal 63 produced by the timing pulse generator 41 is applied through an OR gate 95 to the adder 93. Accordingly, the half-delay registers 88 and 89 store timekeeping data representative of seconds, minutes, hours, AM, PM and the date. Also, a half-delay static register 90 stores timekeeping data added every day, namely, date information and month (and possibly year) information. A selector gating circuit 91 is coupled to the month-date register 90 and to the register 89, which register stores data information, AM, PM, hours, minutes and seconds, to select register 90 once a day when the date is increased. A detecting circuit 92 is provided for detecting the odd and even months in order to provide such information when necessary. A carry detecting circuit detects the count, (1/10, 1/6, 1/7 and 1/12) and when such carry is detected applies through OR gate 95 and NAND gate 96 a indiex by one signal to register 88. As noted above, the other input to OR gate 95, other than the output of the carry detecting circuit 94, is the one second low frequency time standard signal 63 produced by the timing pulse generator circuit 41. A changeover circuit 96 is coupled to the main calculating register 78 and additionally to the adder 93 for changing the input to the register 88 when time correction is effected by reading the new time information into the main calculating register 78, it being noted that the changing circuit 97 is controlled by the ROM circuit 47.

Since data transfer in registers 88, 89 and 90 of the timekeeping circuit occurs once each second, and with respect to certain of the registers only once each day, the power consumption is considerably reduced. It is noted that the display of the month and date information, or alternatively hours, minutes and seconds information, is selected by the keyboard 44 in the manner described above. Additionally, the timekeeping block is coupled to the timing pulse generator circuit and is always operating, even when calculations are being effected, in order to insure that time accuracy is maintained. The output from the NAND gate 96 of the timekeeping circuit and the output of the main calculating register 78 are coupled to a selector circuit 98, which circuit is capable of switching the calculating data and/or time data to the shift register 99 to effect loading thereof. Accordingly, the BCD data is stored in shift register 99, whereafter same is applied to decoder 100, which decoder transforms the BCD coded signals to information for driving the respective segments, the decoder being coupled to zero-suppress circuit 87 through lead 234 to blank the figures that will not display information. Thereafter, the decoded signals are applied to P.S (parallel-to-serial) shift register 101, which register changes the segment drive signals from parallel driving signals into a serial segment driving signal with the decimal point being supplied by decimal point registers 83a, etc. The serial segment drive signals are transferred and stored in a display register 102, when the matter being displayed is to be changed, so that the segments of the display means 103 are staticly driven. The digital display 103 has eight digits including a function display digit of the type described above for indicating when a function is selected by a predetermined key, and seven figures for indicating numerical information.

Since the digital display is comprised of LC display cells, an AC drive signal having a frequency of several tens Hz is applied to the register 102 in order to provide AC driving to the display and thereby lengthen the life thereof. It is noted that since the display register 102 is a static register, and hence information is only transferred thereto when the information therein is to be changed, the same power consumption benefits that insure to the registers in the calculating and timekeeping circuits apply.

It is noted that if the display cells are formed of materials other than liquid crystals, the display shift register would be replaced. For example, if electro-chromic display cells are utilized, the display register 102 would be replaced with a register including an operational amplifier. Similarly, a dynamic driving circuit would be required if the LC display cells were replaced by LED display segments. Finally, if an erroneous operation is performed by the calculating circuitry, such as divide by zero or taking of the square root of a minus number, the error is indicated by a numerical figure in the form of an [E], which figure is readily formed with a seven segmented display digit. Also, if an overflow condition occurs during the calculating steps, the number of overflow figures is indicated by the number of lit decimal points so that a rounding off can be effected. Also, the decimal point can be utilized to monitor the condition of the battery or any otherwise different input applied by the keyboard, by flickering the decimal points. It is noted that the display register 102 is equally suitable for use with seven- and eight-digit displays.

As aforenoted, an alarm time can be stored in the calculating circuit register 78 and 79 by the keyboard 44. When the time stored in the calculating register 78 and 79 are compared with the data in the timekeeping registers by EXCLUSIVE-OR gate 105, which operation is controlled by the ROM 70, an alarm function is provided. Specifically, when the time counted by the timekeeping circuitry coincides with the alarm time stored in the calculating registers, an alarm signal is generated by an alarm detector 106. It is noted that the alarm circuit not only can provide an alarm signal but can serve as a timer for generating an on or off signal at a predetermined set time. Also, a switch 107 is provided for grounding the detector circuit 106 and thereby turning off the alarm.

Figures 19, 22:
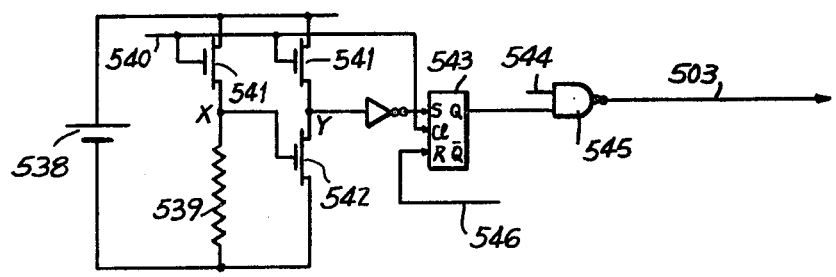
FIG. 19 is a circuit diagram of the battery monitoring circuit depicted in FIG. 9.
FIG. 22 illustrates the manner in which the pads on the display register IC integrated circuit chip are disposed for the circuit module depicted in FIG. 20.

A manually operated switch 109b is coupled through a lead 109a to the selector 98 of decoder circuit 48 for switching the display to display one of calculating information or timekeeping information. It is noted that the calculating operation is inhibited by inhibiting the bit signal 54 applied at the AND gate 108, or alternatively, the digit signals could be inhibited. Finally, as will be discussed in greater detail below, a battery monitoring circuit 85b, illustrated in detail in FIG. 19, is adapted to detect the life of the battery and if same is near impending failure, flicker the decimal point to thereby provide an indication that the battery must be replaced.

Accordingly, in a preferred embodiment, the circuitry depicted in FIG. 9, is integrated into two integrated circuits. A first integrated circuit is utilized for the display registers and the second integrated circuit is utilized for the remaining circuits. In a preferred embodiment, the display register is formed as part of the display means in order to reduce the size of the electronic wristwatch. It is noted however, that the entire circuitry can be formed on a single circuit chip if desired. The instant invention therefore is characterized by the use of a static shift register as memory registers to provide a memory, and reduce the transfer circulation of data to a considerable extent. Moreover, a 24 hour timepiece, a stopwatch or other calculating and storage function can be readily obtained in a wristwatch in view of the reduced power consumption that is provided by the type of registers utilized in the calculating, timekeeping and display circuits.

In order to illustrate the specific circuits utilized to form the timing pulse generator 41, input circuit 45, timekeeping circuit 43, ROM control circuit 47, decoder 48, alarm 50 and display 49, a detailed description of each of these circuits will be provided, like reference numerals being utilized to note like elements described above.

Referring now to FIG. 10, the timing pulse generator circuit 41 is depicted. As aforenoted, the time standard is a flexural mode or longitudinal mode quartz crystal vibrator included in an oscillator circuit having a C-MOS inverter. The high frequency time standard signal 52 produced by the oscillator circuit is a multiple of two ($2^n$) and in the preferred embodiment discussed in FIG. 9, is on the order of 32, 768 Hz. The low frequency timekeeping signal 52 is applied through an inverter to $\frac{1}{8}$ divider 53, which divider in turn is coupled to the bit time counter 55. Bit time counter 55 is a ring counter for generating bit pulses $T_1$ through $T_4$ at a repeat frequency of 4, 096 Hz. The digit time counter 57 is also a ring counter and generates digit signals $D_1$ through $D_9$ in order to perform 1/9 division. It is noted however, that since 1/9th is not a multiple of two, if the output signal applied as a clock signal to the divider 59 were divided by two, it would be impossible to obtain a low frequency time standard signal having a period of one second. Accordingly, the divider 59 is provided with a 1/7 division ratio and the digit time counter 57 performs a 1/10 division once every seven cycles, in order to produce at the output of the 1/7 divider 59 a signal that is a multiple of two. Specifically, by having the digit time counter perform 1/10 division once every seven cycles (1/9 × 6 + 10 × 1) to provide for 1/64 division so that the output 64 produced by the divider 59 is a 64 Hz signal, which signal is applied to six-stage binary divider 62 to thereby produce one-second low frequency time standard signal 63. The compensating signal 125 produced by the divider 59 selects the cycle that the 1/10 division will be effected.

The autoclear circuit 61, discussed above, operates in the following manner. In the ring counter 57, the registers for producing the digit time signal are registers 126 through 134, and are coupled in series with autoclear register 135. The Q output 139 of the autoclear register 135 is coincidentally applied to the EXCLUSIVE-OR gate 136 at the same time as the digit signal $D_1$ during normal operation of the timing pulse generator circuit. Accordingly, during normal operating conditions, the output of the EXCLUSIVE-OR gate 136 is maintained at a low level. Once the power supply is turned ON, each output of the digit time counter 57 is arbitrarily referenced. Since it takes at least one digit, and usually more, to begin operating at a normal rate, the output of the digit $D_1$ may differ with the output of the autoclear register 135 for a certain interval of time. Accordingly, the two inputs of the EXCLUSIVE-OR gate will be different, thereby applying an HIGH voltage signal to the R-S flip-flop comprised of NOR gates 137 and 138, to thereby produce a reset signal. It is noted that such a set or reset signal is not produced during normal operation but ony under unusual operating conditions, such as when the power supply is first turned on. Accordingly, the autoclear signal 61 will be applied to the calculator circuit in order to reference the respective registers, when the normal operating conditions are not detected, in order to reset the registers to a zero condition. Finally, as aforenoted, the pulse generating circuit is always operated, in order to provide a standard signal for the calculating circuitry and timekeeping circuitry.

Figure 11A:
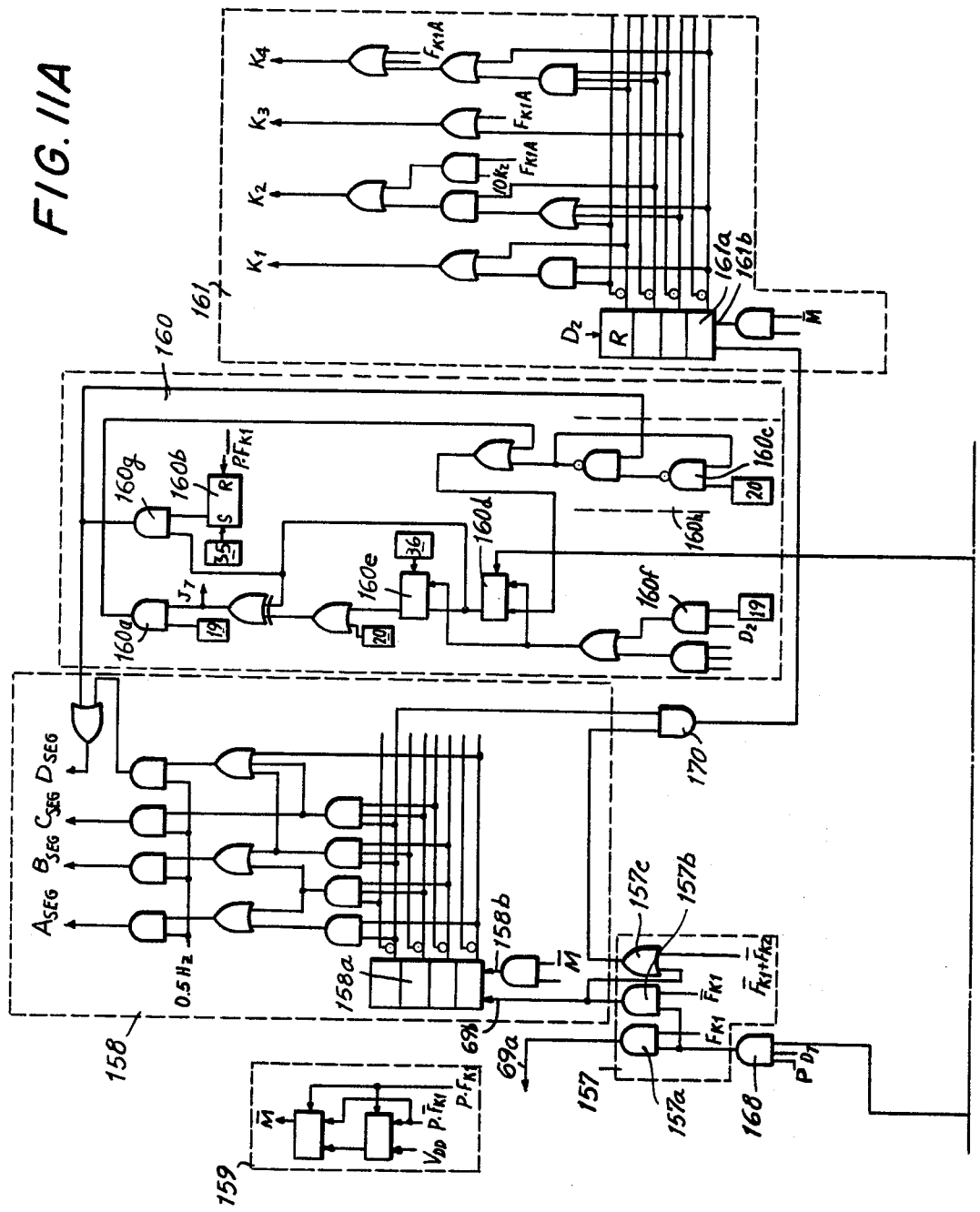
FIGS. 11A and 11B are a composite circuit diagram of the keyboard input circuitry depicted in FIG. 9.
Figure 11B:
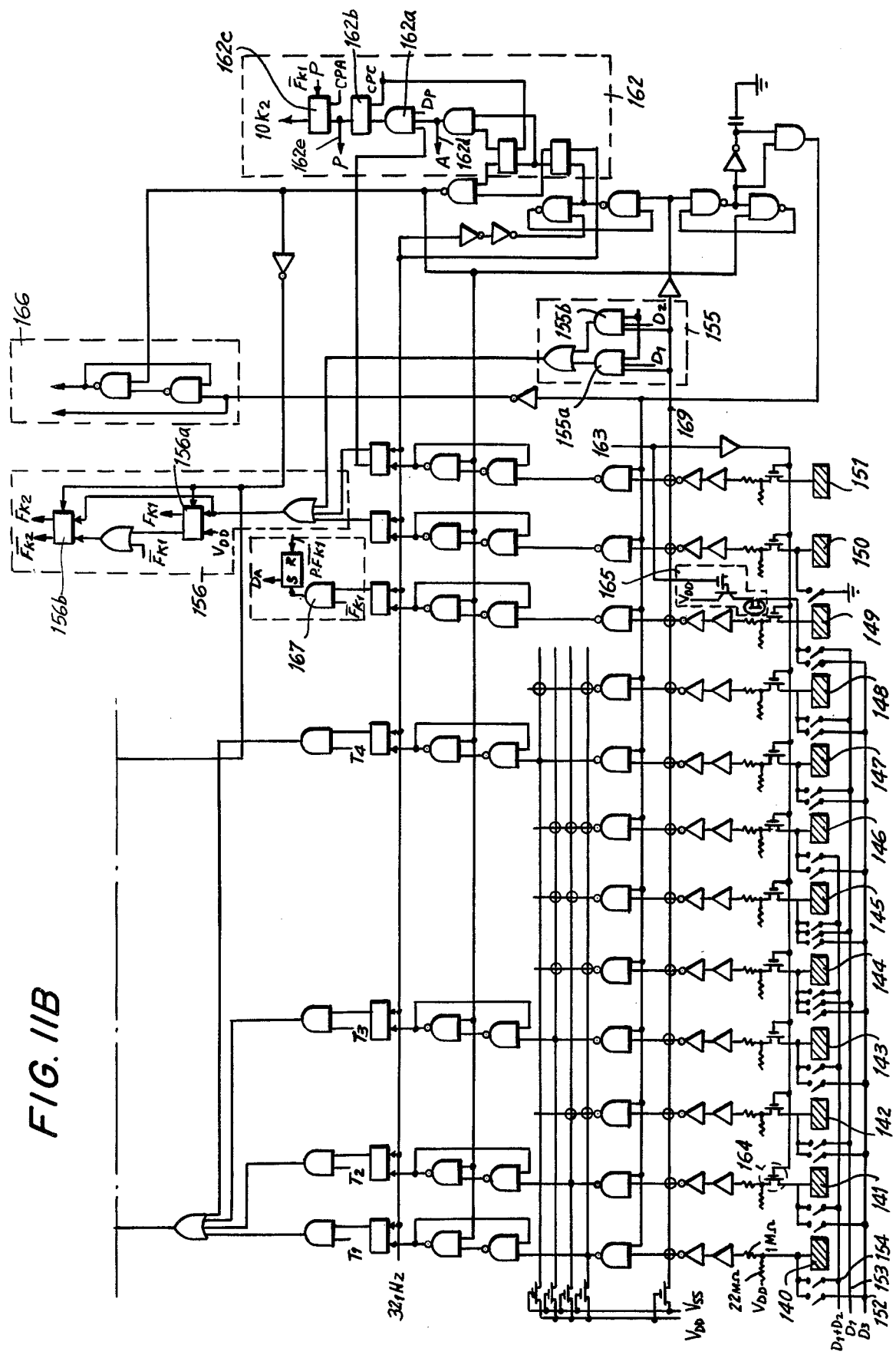

Reference is now made to FIGS. 11A and 11B, wherein the keyboard 44 and input circuit 45 illustrated in FIG. 9 are depicted in detail. It is noted that touch sensitive contacts 140 through 151, the input detecting circuit 65 and the overlap prevent input circuit 66 are identical in every respect to the circuitry described above with reference to FIG. 7. Accordingly, the discussion below is directed to the bit serial BCD code coverter 67 and the input-output signal control circuit 68.

The input to be applied to the circuit is selected by the /F/ key. As aforenoted, if the function key /F/ is not operated, numerical information will be input. Alternatively, if the function key /F/ is operated once, a first function will be selected, and if the function key /F/ is operated twice, a second function will be selected in accordance with the following table:

| Key | 0 time operation of the /F/ key | 1 time operation of the /F/ key | 2 time operation of the /F/ key |
|---|---|---|---|
| 1 | 1 | MK | |
| 2 | 2 | | 1/x |
| 3 | 3 | = | |
| 4 | 4 | T | |
| 5 | 5 | ÷ | √ |
| 6 | 6 | × | $x^2$ |
| 7 | 7 | S | |
| 8 | 8 | — | |
| 9 | 9 | + | |
| 0 | 0 | . | |

Specifically, when reference is made to FIG. 11, the plates 140 through 149 correspond to the keys /1/ to /0/. The plate 150 is for the clear key /C/ and the plate 151 is for the function key /F/. Thus, from the table, it is seen that numerical information is supplied to the calculator circuitry if the function key /F/ is not actuated, and the first and second conditions are selected by a single or double actuation of the function key /F/. As detailed above, the keys having the designation /MD/, /T/ and /S/ thereon, respectively select month and date correction, time correction and second adjustment. The /1 MD/ corresponding to plate 140 effects a change in display of hours, minutes and seconds to a display of months and dates when the wristwatch is in a timekeeping mode. The /0/ key corresponding to plate 149 is coupled to a light energizing circuit 165, for lighting up a lamp in the dark. The lamp will permit reading of the liquid crystal displays in the dark and is only effective when the plate 149 is referenced to a ground potential. It is noted that a P-channel MOS transistor 164 is disposed intermediate each touch plate and the C-MOS inverter circuits for decoupling the tough plates, in response to a HIGH signal 163 when the wristwatch is in a normal timekeeping mode, and couples the C-MOS inverters to the touch plates in response to the signal 163 being LOW, when the wristwatch is in a calculating mode or a time correction mode. Thus, with the exception of the touch plate 140, representative of the /1/ key, which key is utilized to convert the display from a normal timekeeping display to a month and date display, each of the touch plates have the N-MOS decoupling transistor disposed between same and the C-MOS inverters.

Alternatively, when the keys are utilized to apply numerical information or a calculating function, digit signals are utilized to determine whether a numerical input of a functional input is intended. Specifically, a numerical input causes a $D_3$ signal 152 to be produced. Alternatively, if the function key /F/ is actuated once (the first condition), a $D_1$ signal 153 is produced. If the function key /F/ is actuated twice, (the second condition), a signal $D_1+D_2$ along lead 154 is produced. Accordingly, when a signal is applied through lead 169 and is delayed by 32 Hz in order to eliminate chatter in the signal, and thereafter, the inverter signal is further delayed by the CPC signal (1 pulse is generated for each word) and is passed through the AND gate in input control circuit 162, an A signal 162d is produced. If the A signal 162d is further delayed by the CPC signal, a P signal 162e (one word cycle signal) is produced. Whenever the key input is operated, the A signal 162d and the P signal 162e are generated. Both of these signals have a pulse width equal to one word. When the function key /F/ is actuated once, the circuitry is placed in the first condition whereby the signal $D_1$ is applied along the lead 169 at the point at the output of the C-MOS inverter coupled to the OR-connection. Accordingly, the $D_1$ signal is gated through AND gate 155a of function judging circuit 155. The signal $D_1 \cdot T_2 \cdot A$ turns the Q output $\overline{F_{k1}}$ of D-type flip-flop 156a in the function control circuit 156 from a LOW level to a HIGH level. Alternatively, in the second condition, wherein the function key /F/ is actuated twice, the $D_1$ signal is gated through the AND gates 155a and 155b, and the signal $(D_1+D_2) \cdot T_2 \cdot A$ (two pulse signal) turns the Q output $\overline{F_{k1}}$ and $\overline{F_{k2}}$ of the D flip-flops 156a and 156b in the function control circuit 156 from a LOW level to a HIGH level. Stated otherwise, when the function key /F/ is actuated once, the output $\overline{F_{k1}}$ of the function control circuit is set to a HIGH level, and when the function key /F/ is actuated twice, the outputs $\overline{F_{k1}}+\overline{F_{k2}}$ are both set to a HIGH level. It is noted that when the numerical input is desired, the function judging circuit 155 is not actuated and therefore the outputs $\overline{F_{k1}}$ and $\overline{F_{k2}}$ are both maintained at a LOW level.

Accordingly, the input selected by the respective keys is applied to AND gate 168 in the form of a four bit serial BCD code. Digit signal $D_7$ and the one-word signal P are also applied to the AND gate 168 in order to insure that the part of the contact signal corresponding to $P \cdot D_7$ is the only part applied to the selector circuit 157. The selector circuit 157 detects whether the input is a numerical input, a first condition input or a second condition input, and decides whether to apply same as a numerical output signal 69a or as a function output signal 69b. Accordingly, if the input $\overline{F_{k1}}$ is at a low level, and AND gate 157a determines that the input is numerical and sends the BCD code to the calculating shift register. Alternatively, when the first condition has been selected, and the input $\overline{F_{k1}}$ to the AND gate 157a is HIGH, AND gate 157b is gated, to thereby apply the BCD signal to segment decoder 158 for use in the function display. In order to enter a decimal point, the touch plate 151 corresponding to the function key /F/ and the contact 149 corresponding to the /0/ key are actuated, whereafter decimal point signal generating circuit 167 generates a decimal point signal. For the case of a decimal point input, the display will be shifted by one figure to the left if the one word cycle signal P is generated, and the AND gate 162 of the input control circuit 162 is used to inhibit the signal. The same response occurs when the function key /F/ is operated. Specifically, the segment decoder 158 includes a four-bit shift register 158a so that the clock signal 158b is produced only when data is applied to the register.

For example, the $\overline{M}$ signal is utilized as a mask signal when a second function is erroneously selected. As a further example, if the following input "5 × + 2 =" were to be selected, inadvertently, instead of "5 × 2 =", the duplicate function detecting circuit 159 would produce a LOW level $\overline{M}$ signal when the second function mark "+" and inhibits the clock signal 158b of the shift register 158a. Stated otherwise, even if the incorrect second function is selected, the calculation that is performed is the same as if the second function were never selected.

Accordingly, if the function key [F] and the key [9 +] (numerical input 9) were selected, in sequence, a function signal 69b having a BCD value 1001 would be applied to the shift register 158a. Alternatively, the selection of the function key [F] and the [8] key, inadvertently after the [9] key, would apply a BCD signal representative of a "+" sign only. At this time, the display segments are already lit in the manner illustrated in FIG. 2b. Since the [9] key selects the addition function, the lighted segments are A and D segments, which segments are selected by the BCD signal 1001. A 0.5 second (2 Hz) signal is set and generated when the first condition is selected by the function key [F], and thereby lights up the function display for 0.5 seconds. When the clear key [C] is operated, the shift register 105a is in a 1001 binary state (representative of a + signal) but in view of the actuating of the clear key [C], the 0.5 second signal is not utilized as a setting signal. Thus, the segments are not lit even if the clear key [C] is operated. However, when the information is being processed to be calculated, the information becomes negative, a negative signal generating circuit 160 effects a lighting of the D segment.

As noted above, with respect to FIG. 7, the signal $10k_2$, which signal is the Q output of D-flip-flop 162c of input control circuit 162, is synchronosuly set by the error to a low level of the P signal 162e. Specifically, the signal $10k_2$ is set when the second numerical figure is entered and the state of same does not change until a reset signal is applied (the first condition is provided). The A signal produced at 162 occurs prior in time to the P signal produced at 162e by one word, and the pulse width of same is one word. Accordingly, whether it is a first numerical input or the second numerical input is determined when the $10k_2$ signal is set by the falling of the P signal at 162e. In the negative signal generating circuit 160, a set signal [36] (the use of a numeral in a block with respect to negative signal generating circuit 160 is utilized herein to simplify explanation of same), is applied to R-S flip-flop 160b when the calculation operation is completed. Similarly, signal [20] applied to NAND gate 160c of R-S flip-flop 160h is generated when the sign before and after "=" are different, such as an addition and/or subtraction operation being effected (e.g., 5 − 2 =3), and is utilized as a clock signal for the flip-flops 160d and 160e. The input signal [19] of AND gate 160f is a signal generated when the sign is changed, when the calculation requires the multiplication and division of numbers of different signs. Specifically, when the flip-flop 160d is set, and the calculation is completed, AND gate 160d produces a HIGH output signal which effects a lighting of the D segment electrode. The outputs of the flip-flop 160d and 160e are compared by an EXCLUSIVE-OR gate, which gate applies a comparison signal $J_7$ to AND gate 160a, which gate is fed back to the set-reset flip-flop 160h. The signal $J_7$ is applied to the judging circuit of the ROM when the two input signals utilized to determine same are at different binary levels. In a first condition, since one input $\overline{F_{k1}} \oplus \overline{F_{k2}}$ of OR gate 157c of the selecting circuit 157 is at a HIGH level (the exclusive logical sum), and an output of the shift register 158a is therefore supplied to four-bit shift register 161a of decoder circuit 161 through AND gate 170.

Also, clock signal 161b is checked when the mask signal $\overline{M}$ becomes a LOW level signal, in addition to the function noted above that occurs when the $\overline{M}$ signal is at a LOW level. Decoder circuit 161 therefore provides four outputs $K_1$, $K_2$, $K_3$ and $K_4$, which outputs are sent to a loading flip-flop for operating the ROM to select addresses representative of the register addresses at which the calculation steps are to be started. The outputs $K_1$ through $K_4$ of the decoder circuit 161 depends on the timing of the A signal in the following respect. At the first numerical figure input, $F_{K1} \cdot A$ is HIGH so that $K_3$ and $K_4$ are HIGH (0011). However, at the second numerical figure input, $10_{K1} \cdot F_{K1} \cdot A$ and $F_{k1} \cdot A$ are HIGH so that $K_2$, $K_3$ and $K_4$ are HIGH (0111). Thus, the respective signals produced by the input control circuit 162 are utilized to perform selection of the addresses by the ROM.

Signals read into the shift register 161a generate the signals $K_1$ through $K_4$ and are timed by the P signal, which signal is entered into the loading flip-flop for selecting an address by the ROM.

When the second condition is selected $F_{k1}$ and $F_{k2}$ are HIGH level signals, thereby producing an exclusive logic sum representative of a LOW level signal. In such an event, the signal produced at the output of the AND gate 157b of selecting circuit 157 is applied through OR gate 157c and AND gate 170 to the shift register 161a. For this condition, the value read into the shift register 158a is, as aforenoted, 1001, thereby opening the AND gate 170 to pass the signal therethrough. Accordingly, the signal entered into the shift register 161a is applied to the loading flip-flop in the form of output signals $K_1$ through $K_4$, which signals are utilized by the ROM in selecting an address. Finally, the R-S flip-flop 166 is utilized as a detecting circuit for detecting either unusual inputs or inputs that do not represent functions that are able to be carried out by the calculator.

Figure 12:
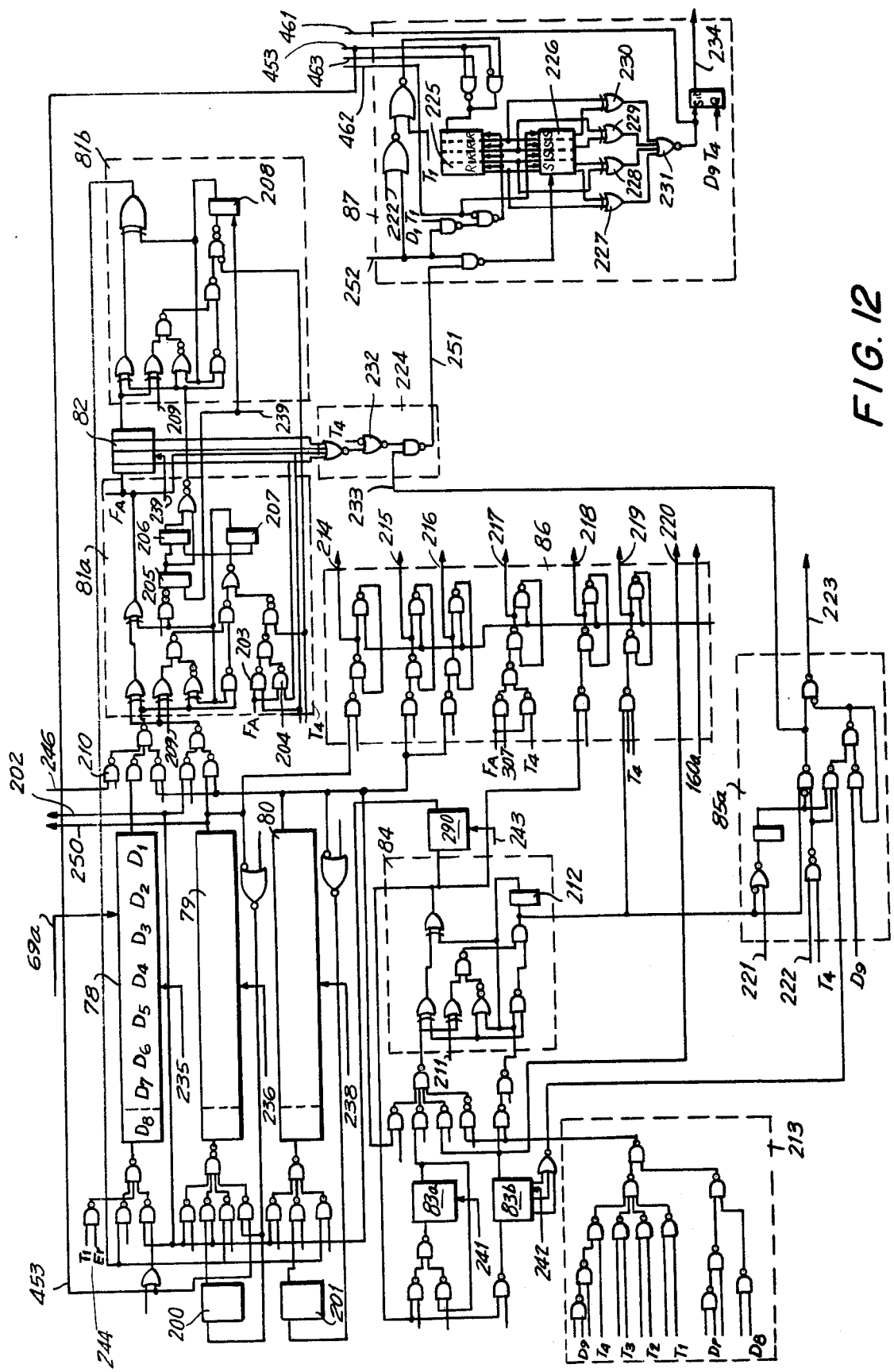
FIG. 12 is a detailed circuit diagram of the calculator circuitry depicted in FIG. 9.

Reference is now made to FIG. 12, wherein the calculation circuit 46 is described in detail, like reference numerals being utilized to note like references discussed above. As aforenoted, main register 78, first auxiliary register 79 and second auxiliary register 80 are static shift registers and are utilized as the main registers for performing calculating operations. Accordingly, the registers are 32-bit registers for storing data in binary-coded decimal form. Each of the registers is comprised of eight digits, of which each one digit requires four bits. In addition to the shift registers 78, 79 and 80, the calculating circuit is further constituted by four-bit auxiliary shift registers 82, 200 and 201. The transfer of data, such as between registers, to the adders for effecting calculations, and circulating the data in the registers, is controlled by the use of NAND and/or NOR gates, and the like, provided at the input or output of each register. Each control signal is applied by the ROM circuit 47, described in greater detail below with respect to FIG. 13. Accordingly, the gating circuit not having reference numerals at the inputs thereof, are those inputs from the ROM circuit 47. Additionally, since the number of gates utilized to control each register are considerable in number, most of the gating networks have been omitted from FIG. 12, with a sufficient number of gating networks provided to facilitate an understanding of the calculating circuitry operation. Also, it is noted that the bit signals $T_1$, $T_2$, $T_3$ and $T_4$ and the digit signals $D_1$ through $D_9$ are those signals discussed above with respect to the timing pulse generator circuit 41 described above in detail in FIG. 10.

Figure 14:
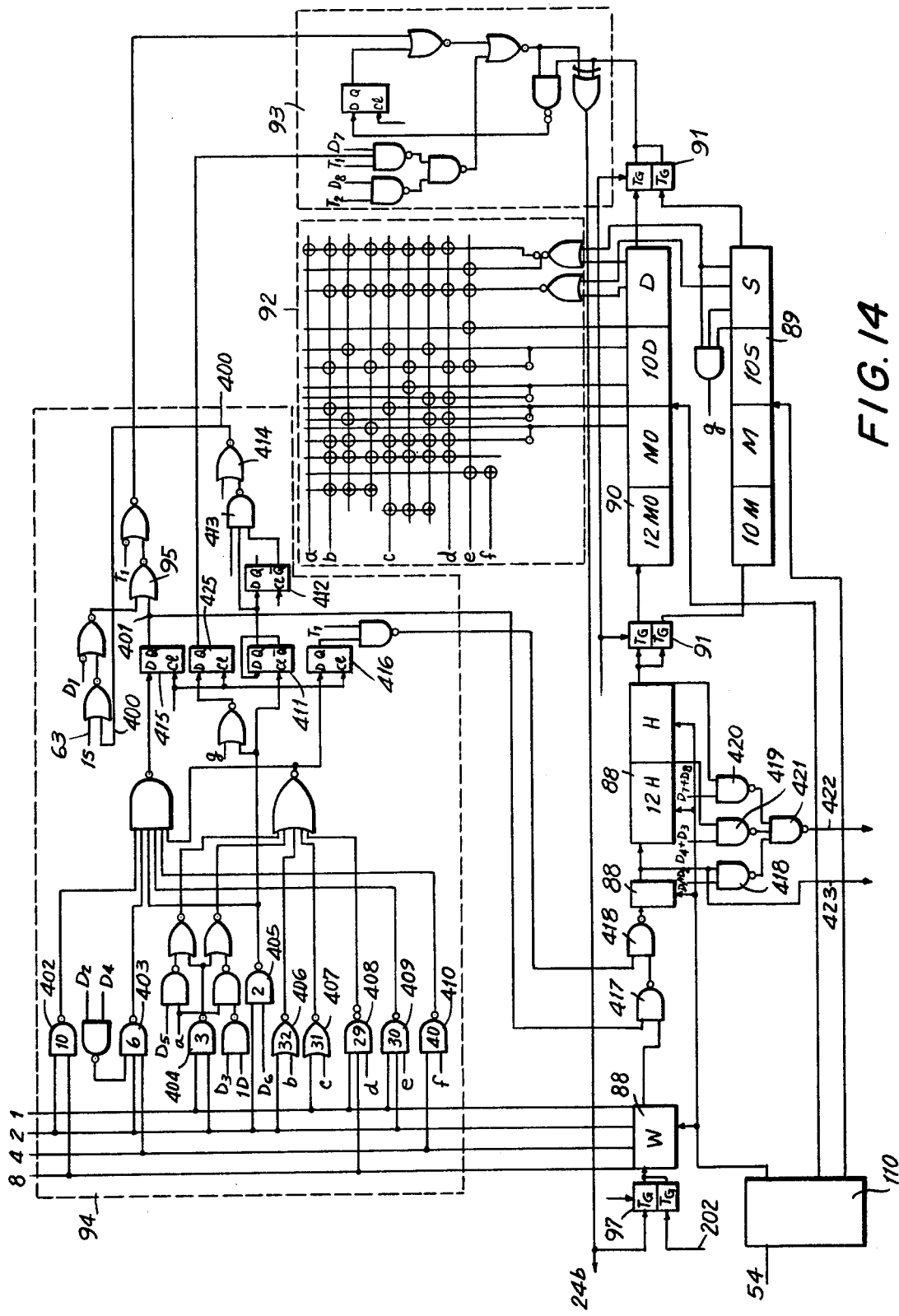
FIG. 14 is a detailed circuit diagram of the timekeeping circuitry depicted in FIG. 9.

The main register 78, as aforenoted, not only is capable of performing calculating operations, but additionally, is utilized for storing numerical inputs, the alarm time setting, or information to be displayed, and has a numerical signal input 69a and a display output 202. Additionally, main register 78 includes an input gate 210, which gate is utilized when the division registers 88 and 89 of the timekeeping block, described below and illustrated in detail in FIG. 14, are utilized as memories, when a calculating operation is effected. Adders 81a and 81b are full adders for providing ± 6 compensation. Specifically, full adder 81a detects whether the value of the added or subtracted result is not less than 10 and not more than 15 by utilizing detecting gates 203 and 204 and the manner in which the output thereof is utilized to control the ± 6 signal generating flip-flops 205 and 206, which signals will be added or subtracted by full adder 81b. Bit carry and digit carry are affected by storage flip-flops 207 and 208 in full adders 81a and 81b. The input lead 209 in full adders 81a and 81b select whether addition or subtraction is to be effected. Specifically, when the signal applied to the lead 209 is HIGH, subtraction is selected, and when the signal is LOW, addition is selected. The signal 209 is controlled by the ROM during calculation. Shift registers 83a and 83b are four-bit decimal point shift registers. Full adder 84 is utilized to compare the number of decimal figures and perform addition and substraction of the decimal numerals. The signal 211 applied to the full adder 84 is utilized to select addition or subtraction in response to the signal being a LOW level or HIGH level, respectively. Flip-flop 212 is a full adder 84 and is utilized to store the carry and borrow signals.

The gates 213 are utilized to generate four-bit binary numerals, to effect carry of the decimal point of an entered numeral which has a decimal point, and to suppress a numerical input having a number of digits in excess of that capable of being handled by the calculator circuitry.

Judging flip-flops 86, are utilized to judge the condition of each register during a calculating operation. For example, flip-flop 214 judges whether the lowest figure and the highest figure is or is not zero. Flip-flop 215 detects zero with respect to the lowest and the highest digits in the register 80, and flip-flop 216 detects zero with respect to each of the digits stored in the register 80. Flip-flop 217 is utilized to detect a zero condition with respect to the lowest and highest digits in the register 78 and detects whether the highest digit stored therein is or is not a complement. Flip-flops 218 and 219 detect whether the number of digits lower than the decimal point is large or small. Signal line 220 judges whether the number of figures lower than the decimal point is odd or even. Signal line 160a carries the signal produced by the input circuitry determining whether the sign of the input numeral is positive or negative. Whether the calculating address of the ROM are to be jumped or not is determined in response to the state of the judging flip-flop. The input $F_A$ is an input signal of the auxiliary register 82.

The circuit 85a is utilized to indicate a decimal point and is operated only when the indication address 0 of the ROM is selected. Signal 221 is a 0 address signal. Display signal 222 is the 0 address signal. The indicating circuit 85a produces a decimal point indicating signal 223, which signal is applied when a decimal point is ordinarily used (such as 1.03) and also, when the number of digits is over the predetermined number of digits when multiplication and like calculations are completed. The decimal point indicating signal 223 is thereafter transferred to the decoder circuitry, described in greater detail in FIG. 16.

A zero suppression circuit 87 detects the display digit to be displayed and stores the highest display digits. Counter 225 is a counter equal to the number of digits to be displayed. Latch circuit 226 provides a memory so that the timing of the loading of the data from the counter 225 into the memory 226 coincides with the timing of detecting digits other than zero by gate 232 of the circuit 224 and the decimal point digit signal 233, so that the largest magnitude display digits are stored. The zero suppress signal 234 is generated when the data stored in the latch type memory 226 is compared by coincident circuits 227 through 230 and NOR gate 231 with the information in the digit counter 225 so that the digit counter 225 can once again operate after a 0 indication address is selected, and thereafter, the information is transferred to the decoder circuit.

Figure 15:
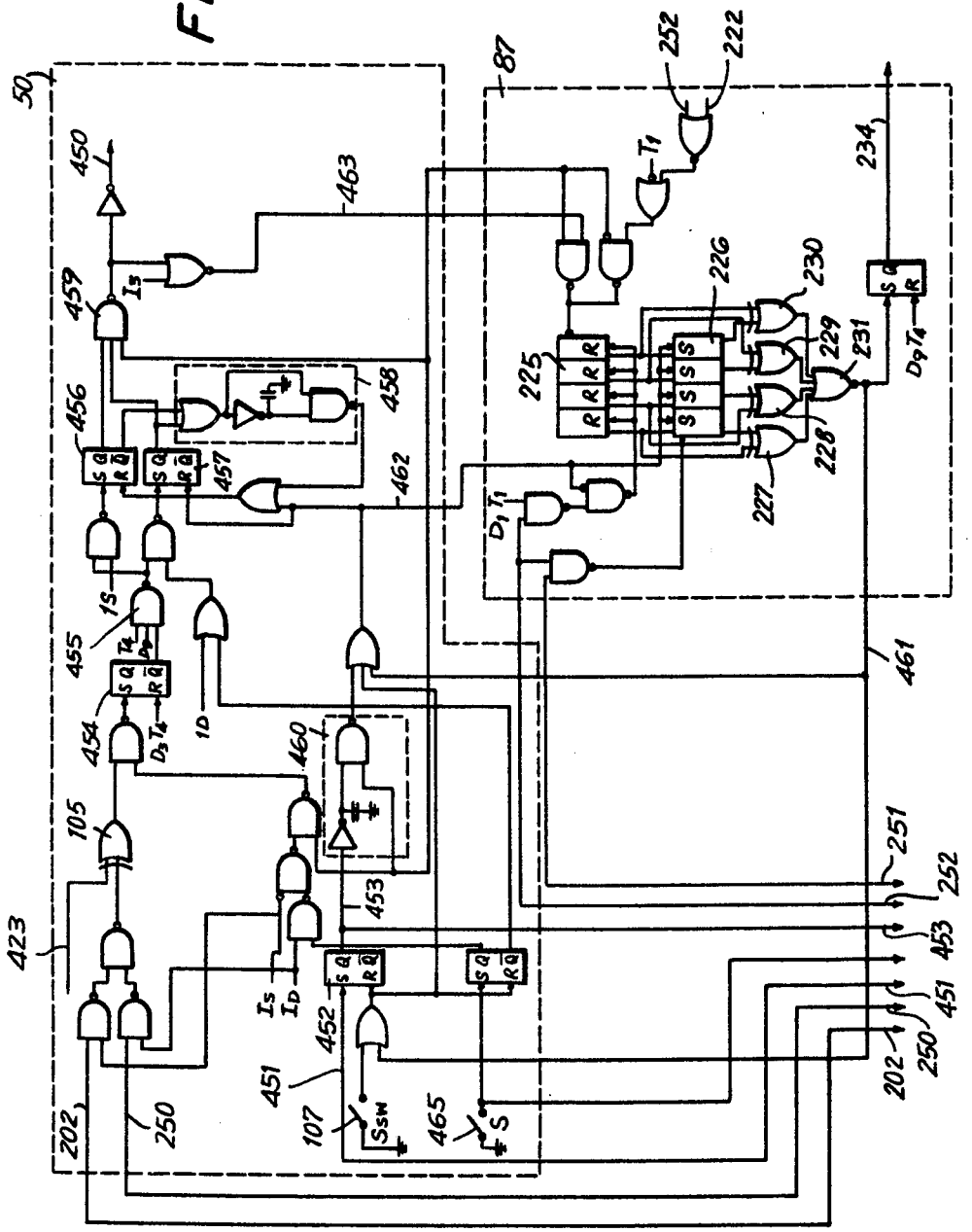
FIG. 15 is a detailed circuit diagram of the alarm circuitry depicted in FIG. 9.

Also, the zero-suppress circuit 87 can be utilized as a control circuit for the alarm circuit described in greater detail, with respect to FIG. 15. In such event, control signals 462, 463 and 453 are applied thereto. The signal 453 indicates an alarm setting state for making the number of digits in the registers 78 and 79 coincident with the number of digits in the storage registers 88 and 89 of the timekeeping circuit. Error signal 244 is utilized to transfer the binary numeral [1] to each of the digits of the main register 78 to provide an error display [E] to all of the digits of the display block when an error is detected during a calculating operation. This results because the segments in a seven-segment display that are utilized to provide a [E] display correspond to the same segments not driven for the [1] display. It is noted that each of the registers is a half-delay static register and is described in greater detail below.

Main register 78, 79 and 80 receive clock signals 235, 236 and 238, and auxiliary register 82 receives clock signals 239. Also, decimal point registers 83a, 83b receive clock signals 241, 242 and 243. These clock signals are not always supplied during a calculating operation, but instead are supplied only to the registers wherein information is circulated and transferred in order to minimize the power consumption of the circuits. It is further noted that the time required to display the results of the calculating operation is longer than the time required to perform the calculations. Accordingly, the display data is transferred from the decoder circuit to the display circuit for only a time corresponding to several words, and only when the display address, address 0 in this embodiment, is selected, to wit, only when the display is to be changed because numerical information has been inputed into the registers or when a calculation is effected, in order to reduce the current consumption. Similarly, the decimal point indicating circuit 85a and zero-suppress circuit 87 are operated only when the display address is selected and only for a duration of time corresponding to several words. It is noted that when the wristwatch is in a timekeeping mode, the calculator circuit is not functioning, the functioning thereof being prevented by checking the timing signals such as the clock signals or digit signals controlled by the ROM circuit, which operation is described in greater detail below with respect to FIG. 13. This step further reduces the power consumption during normal timekeeping operation and in this respect, the calculating circuit can be turned off by not applying any power thereto. Finally, the memory function provided by the respective calculating register can be used, not only for storing timekeeping data or calculating data, but for storing particular numerical information such as holidays, national holidays, birthdates, telephone numbers, credit card numbers or time conversion information for determining the time in other parts of the world.

Figure 13:
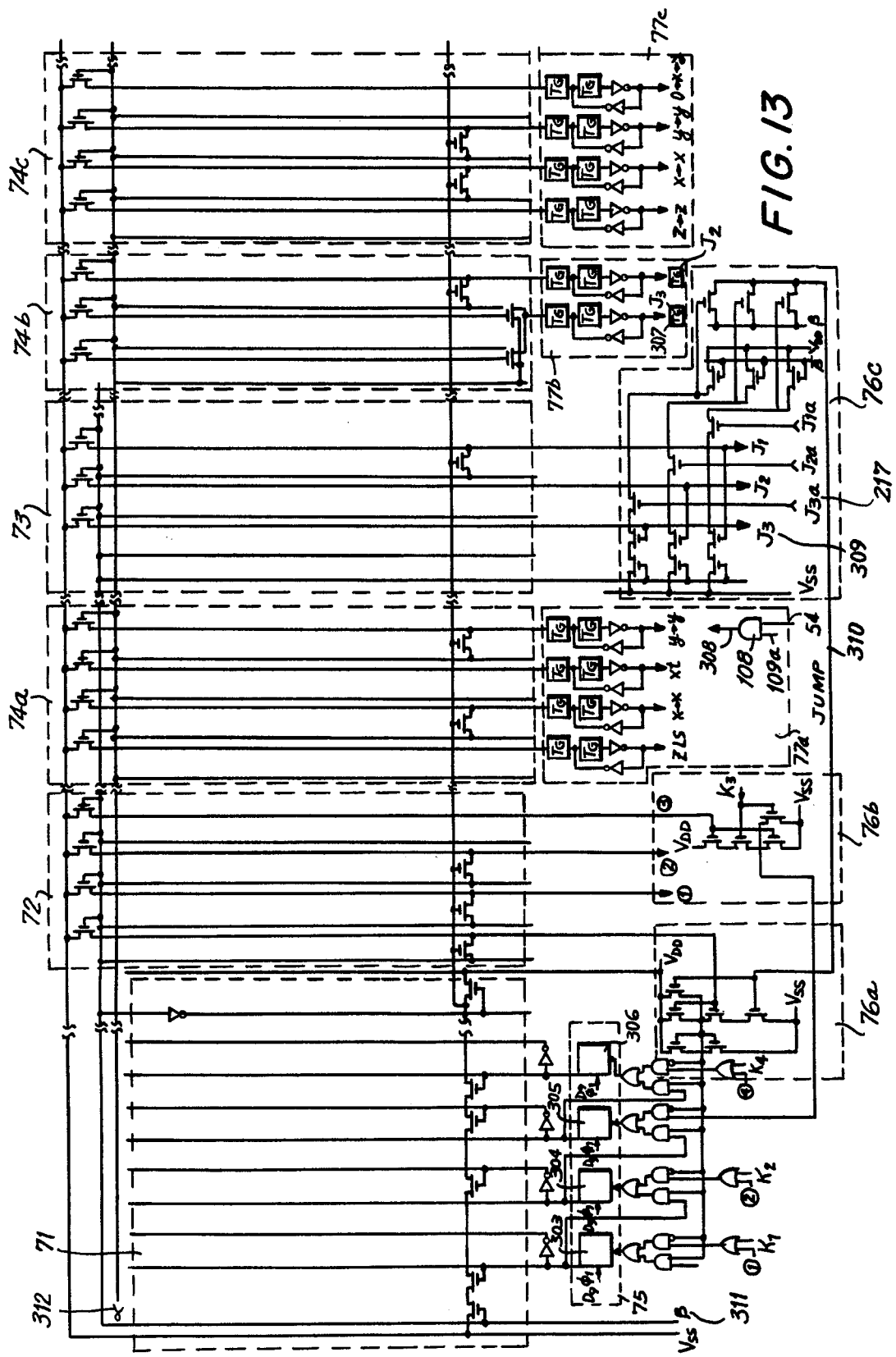
FIG. 13 is a detailed circuit diagram of the program controlled ROM depicted in FIG. 9.

Reference is now made to FIG. 13, wherein ROM circuit 47 is illustrated in detail. Loading register 75 selects an address at which a calculation operation is to begin and is coupled to address selection AND matrix 71. The next address selecting matrix 72 is an OR matrix, the clock signal control matrix 74a is an OR matrix, the jumping matrix 73 is an OR matrix, and so is the flip-flop jumping control signal matrix 74b. Control matrix 74c is also an OR matrix. Loading register 75 is a six bit register and is capable of selecting no more than sixty-four addresses. In order to simplify the illustration depicted in FIG. 13, only four bits are illustrated, with the remaining two bits omitted. In operation, when the clear key $\overline{C}$ is actuated, no data is read into the six bits of the loading register 75 so that the value of same is 000000, which represents a clear address. If a specific numeral is entered at this time, the P signal is generated, and the address of the first figure entered is selected according to the timing of the A signal (the value of registers 303 through 306 is 0011), and the input signal is transferred to the calculating register at this address.

Additionally, when the next word of information is selected, the display address is selected in order to effect a display of this information. When the second digit is entered, the value of the registers 303 through 306 becomes 0111, and the second digit address is selected according to the timing of the A signal. When the respective addresses are selected, clock signal control matrix 74a and control circuit matrix 74c supply the necessary signals to the calculator circuit. If the next input is a function signal, such a signal will bring the registers 303 through 306 of the loading register 75 to a predetermined state, so that same will select an address corresponding to the predetermined state and thereby effect a calculating operation. The calculation is performed in a predetermined programmed manner, whereafter, the next address to be selected is selected by the judging circuit. Specifically, the next address that is selected is selected so that when the jump signal 310 is produced, it is applied to the loading register 75 through jump AND circuit 76a and, at the same time, the number 1 through 6 of the next address selecting matrix 72 is supplied to the load register 75, the number 1 through 4 being supplied with outputs $K_1$ through $K_4$ of the decoder 161 illustrated in FIG. 11 so that register 75 produces the OR outputs.

The jump signal 310 is produced in the following manner. At the address selected when a function signal is applied, a signal, hereinafter referred to as $J_3$, is generated by the jump flip-flop control signal matrix 74b, and is temporarily stored at the output 307 of latch type memory 77b. The signal $\overline{J_3}$ produced at the output 307 of the latch type memory is a setting signal for a select flip-flop of the judging flip-flop 86 in the calculator circuit 46. When the judging flip-flop is set, its output $J_{3a}$ applied at lead 217 becomes an HIGH level signal, and if signal $J_3$ produced at lead 309 is selected, the jump signal 310 is applied through an AND gate 76c as a result of the signal $J_{3a}$ and $J_3$ being respectively produced at leads 217 and 309 being applied to the AND gate 76c. Accordingly, in response to the signal applied by the keyboard, the address is selected, the clock signal and control signal required to effect the calculating operations are generated. After the programmed calculation is effected, the next address is selected by the judgment circuit, the calculation result is displayed, and the calculation operation is terminated.

It is noted that the ROM is entirely comprised of MOS transistors. The AND matrix is comprised almost completely of N-channel MOS transistors and the OR matrix is comprised almost entirely of P-MOS transistors. Accordingly, the AND or OR circuits can be comprised of C-MOS transistors. Though the address time of the ROM matrix is one word, the power consumption of the ROM is considerable, even if only operated for an interval of time equal to one word. Therefore, the latch circuits 77a through 77c correspond to the respective digit outputs of the ROM and thereby make it necessary to operate the ROM only when an address is changed by storing the address information during the remaining period that the calculating circuit is operating.

The latch circuit 77 is disposed at the outputs of the clock signal generating OR matrix 74a, jump flip-flop control signal OR matrix 74b and control circuit OR matrix 74c. The timing of the loading of the latch circuit 77a through 77c is effected in the following manner. The timing with which the address is selected by the ROM is synchronized by a pulse $D_{9\phi 1}$, which pulse is synchronized with the end of the word signal at the loading circuit 75. Accordingly, a load timing signal $\alpha$ is applied to the ROM output switching circuit, which output is supplied to the latch circuits 77a through 77c immediately after the next address of the ROM is selected, the load timing signal $\alpha$ having a pulse width equal to $D_1$ and hence is generated once each word. It is therefore sufficient that the ROM is operated only at the time that an address is selected, and loading into the latch circuit is effected. A signal $\beta$ controls the gate electrodes of the MOS loading transistors of each matrix, and each MOS transistor in the matrix. Accordingly, the ROM does not operate during a single word, resulting in reliable operation and a reduction in power consumption. It is noted that the next address selecting OR matrix 72 and the jumping OR matrix 73 are not provided with a latch circuit at the output thereof since same may only be operated at the time that selection of the next address occurs.

Stopping of the operation of the calculator circuitry is easily effected since clock control OR matrix 74a controls all the clock signals applied to the respective registers of the calculator circuit 46. Stated otherwise, clock signal 54 produced by the timing pulse generator and applied through AND gate 108 is controlled by the calculator-timekeeping switching signal 109a so that the source of the calculating clock signal 308 is controlled, resulting in the calculator circuitry being readily stopped when desired.

Reference is now made to FIG. 14, wherein the timekeeping circuit 43 is depicted in detail, like reference numerals being utilized to note like elements described above. Shift registers 88 and 89 are static shift registers that operate as counters for storing information representative of the days of the week, AM, PM, hours, minutes and seconds. Additionally, static register 90 is utilized to store a count representative of a particular month and date. It is noted that the designation 12A and H in register 88 is utilized to designate tens of hours and hours stored in the particular register. Similarly, the designations 10M, M, 10S, S are utilized to designate the storage of information representative of tens of minutes, minutes, tens of seconds and seconds, respectively, in the static register 89. Also, the designations 12MO, MO, 10D, D are utilized to designate the tens of months, months, tens of days and days in the month and date static register 90. The data stored in the registers 88 and 89 are circulated once each second, whereas the data in the register 90 is circulated once each day. As in conventional timekeeping operations, the binary number [1] is added in response to each circulation of data in the respective registers to store the data counted each second or, alternatively, each day. Since the month and date register 90 is comprised of four digits, the data therein is transferred by switching a portion of the registers 88 and 89 by utilizing the transmission gate 91.

Adder 93 is provided for adding a pulse supplied thereto each day and each second. In addition, adder 93 performs a carry operation in response to the one second signal 63, one day signal 400 and carry signal 401 respectively applied thereto, and effects storage of this information in the respective registers pertinent thereto. The carry signal is provided by the carry detecting circuit 94. A NAND gate 402 is utilized to detect a decimal carry of the seconds digit, minutes digit, hours digit, date digit and month digit. A NAND gate 403 is utilized to detect a carry signal representative of a hexadic count of the tens of seconds digit and tens of minutes digit. A NAND gate 404 is utilized to detect a two decimal carry of the twelve hours figure and twelve months figure. NAND gate 405 is utilized to detect a carry signal representative of the tens of hours of the twelve hour digit. The one day signal 400 is produced by divider 411, shift register 412, NAND gate 413 and NOR gate 414. NOR gates 406 through 410 are utilized to detect the carry signal of the months digit and whether or not same is odd or even. NOR gates 406, 407, 408, 409 and 410 are respectively utilized to detect a thirty-one day month, thirty day month, twenty-nine day month an odd month digit and an even month digit. Specifically, the matrix 92 detects the odd and even months and produces a detected output A to G, which outputs, *a* through *g*, represent the outputs detected thereby. Flip-flop 415 is utilized as a single digit delay shift register. Flip-flop 415 in response to detecting the carry signal produced for a first digit, applies same to the next digit to index same by one, and thereafter indexes the first figure to [0] through NOR gate 417. By way of example, if the ten second digit [10S] is indexed to six (60 seconds) by the adder, shift register 415 effects the application of the carry signal to the minute digit [M] and references the ten second (10S) to [0]. The shift register 416 is utilized to provide a one digit delay when the hours digit is carried from 12 to [1] (from 12-o'clock to 1-o'clock) and not to [0] as is described in the above example. Accordingly, the shift register applies the BCD value [1] through gate 418 to the hours digit. A further shift register 425 is utilized to return the date digit to [0]. NAND gates 418 through 419 are utilized to delay the time data by one or two digits. For example, when the time data 423 is transferred to apply day, second, minute and hour data continuously, the seconds digits, minutes digits and hours digits are separated in the display means to provide a simple display, by delaying the data signal by a single digit at the intervals between the ten second digit and the minute digit, as well as the intervals between the ten minute digit and the hour digit. Accordingly, the time signal 422 is a time delayed signal. In the timekeeping circuit, the counting of time is always taking place, even when calculating operations are being effected by the calculating circuitry. Accordingly, the register 88, 89 and 90 are utilized not only to store time information, but can also be utilized as memories for the calculator with the output signal 246 representing such information. The transmission gate 97 is utilized to change the input when the time is corrected to the out-output 202 of the main register 78 of the calculator circuit. The transmission gate 91, in addition to selecting the respective register once a day, when the date signal is added, also selects the register 90 when the /1MD/ key is selected to indicate the month and date, so that the month and date information stored therein can be applied to the display decoder circuitry. Also, in addition to hours, minutes and seconds, the days of the week and the month and date can be added to the type of information that is readily processed by the timekeeping circuitry and is readily displayed. Control circuit 110 is utilized to control the clock signal utilized to synchronize each shift register and is operated by clock signal 54 produced by the timing pulse generator circuit. As in the aforedescribed embodiments, the clock signal only operates the respective circuits when timekeeping data is changed, namely every second, every day and when the date display is selected by the key therefor, such energization taking place for a period equal to only several words, to thereby reduce the power consumption of the circuit.

With respect to the mode of time correction briefly discussed above, the correct time is entered into the main calculating register 78 by operating the necessary keys in the keyboard 44. When the time desired is indicated in the display means, the information stored in the register is transferred to the timekeeping storage registers 88, 89 or 90 to simultaneously change those portions of the digit information stored therein that are not correct. Also, it is possible to simultaneously select and correct only certain digits, or to correct selected digits in a sequential or step-wise fashion by utilizing the adder circuit. Additionally, a special timing zone is provided for eliminating an improper correction of time when the corrected time overlaps with a time counted by the adder circuit 93 to thereby assure that the time count occurs every second or every day, as is appropriate.

Reference is now made to FIG. 15, wherein a detailed illustration of an alarm circuit 50, for use with the electronic wristwatch circuit depicted in FIG. 9, is depicted. In general, the time required to be identified by the alarm can include the day of the week, AM or PM, hour, minute, second, month and date, and the specific data representative thereof is loaded into the registers 78 and 79 of the calculator circuit 46. This data is thereafter compared with the time stored in the registers in the timekeeping circuit every second and/or every day so that a coincidence condition between this information can be detected and an alarm signal 450, representative of such coincidence, can be generated. After a predetermined period of time, such as fifteen seconds, the alarm signal is automatically terminated. In addition, the timing of the alarm is decided by another function of the zero-suppress circuit detailed above with respect to FIG. 12.

Specifically, the alarm circuit 50 operates in the following manner. When the alarm time is to be set, the input data such as the date, AM, or PM, hour and minute are loaded into register 78 of the calculator circuit in the manner noted above, and the alarm time is also identified by the month and date. The month and date data that is to be compared with the month and date data stored in the register 90 of the timekeeping circuit is loaded into the register 79 by use of any of the other keys, such as the [3 =] key, illustrated in FIG. 15 as key 465. Alarm setting signal 451 is provided by an alarm key, or the like, and stores the alarm setting condition in a set-reset memory flip-flop 452. In the alarm setting condition, a comparison between a time signal 423 and the date, AM or PM, hour and minute signal 202 stored in the register 78 or a month and date signal 250 representative of the information stored in the register 79 is performed once each second and once each day by a one second signal $I_s$ and a one day signal $I_d$. The comparator is comprised of an EXCLUSIVE-OR gate 105, which gate compares the minutes digits and those digits higher than the minutes digits. When there is a difference therebetween, even if the difference is as small as one bit, the difference condition is stored in a set-reset memory flip-flop 454. When a difference is detected, the output $\overline{Q}$ of the memory flip-flop 454 is referenced to a LOW level, so that the output of the NAND gate 455, to which the signal $\overline{Q}$ and the last bit of the comparative word, namely, $D_9.T_4$ are applied, is maintained at a HIGH output level. However, when the respective data compared by the comparator is coincident, the output $\overline{Q}$ of the memory flip-flop 454 is changed to a HIGH level, so that the output of the NAND gate 455 is changed to a LOW level and is stored in memory flip-flop 456. The memory flip-flop 456 is utilized to store a signal representative of the coincidence of the date, AM or PM, hour and minute information stored in the main register, whereas memory flip-flop 457 is utilized to store a signal representative of coincidence in the month and date information stored in the first auxiliary register 79. Pulse generating circuit 458 is adapted to apply a reset pulse to the hour and minute memory flip-flop 457 when the month and date data are not coincident therewith, but the AM or PM, hour and minute data are coincident with the alarm time information read into the main register of the calculator.

When there is coincidence between the alarm time and the actual time, and such coincidence is detected by the comparator, an alarm signal 450 is produced at the output of the NAND gate 459. Moreover, upon detecting such coincidence, the counter 225 of the zero-suppress circuit 87 commences counting each second. The value [1111] having been previously set in the latch memory 226 by a reset pulse generator 460 at the time that the alarm is set, permits the count in the counter 225 to coincide with the count in the latch type memory 226, (15) seconds after the alarm signal 450 is first generated. This signal is utilized to reset the alarm setting memory flip-flop 452 and the coincidence memory flip-flops 456 and 457, thereby terminating the alarm signal 450 from being produced. Switch 107 is provided for manually resetting the alarm set memory and stopping the alarm signal.

As aforenoted, in such an alarm circuit, the alarm time is set, an alarm signal is generated at the time set, and the alarm signal is automatically stopped after a predetermined period. The time during which the alarm signal is generated is decided by the zero-suppress circuit, which circuit has other functions to perform. Thus, a simplified alarm circuit is provided. Although not described herein, the alarm circuit can be readily adapted to perform a plurality of functions in addition to producing an alarm signal. For example, the alarm circuit can be utilized to provide an alarm after a set period and can continue to provide such alarm after the set period or after a particular time that has been set. Also, the alarm can be reset for a predetermined interval so that the alarm is turned on a predetermined period after the alarm signal is first terminated. An alarm signal can be provided twice a day at the same time by ignoring the AM and PM information stored in the register. Alternatively, by recognizing the AM and PM information, the alarm can be actuated once a day. Similarly, the alarm can be set to be operated once each day at the same time and the period that the alarm operates can be selected by the operator. Finally, the alarm can be started at the beginning of a period and stopped after a set period or at a particular time if such an alarm function is desired.

Figure 16:
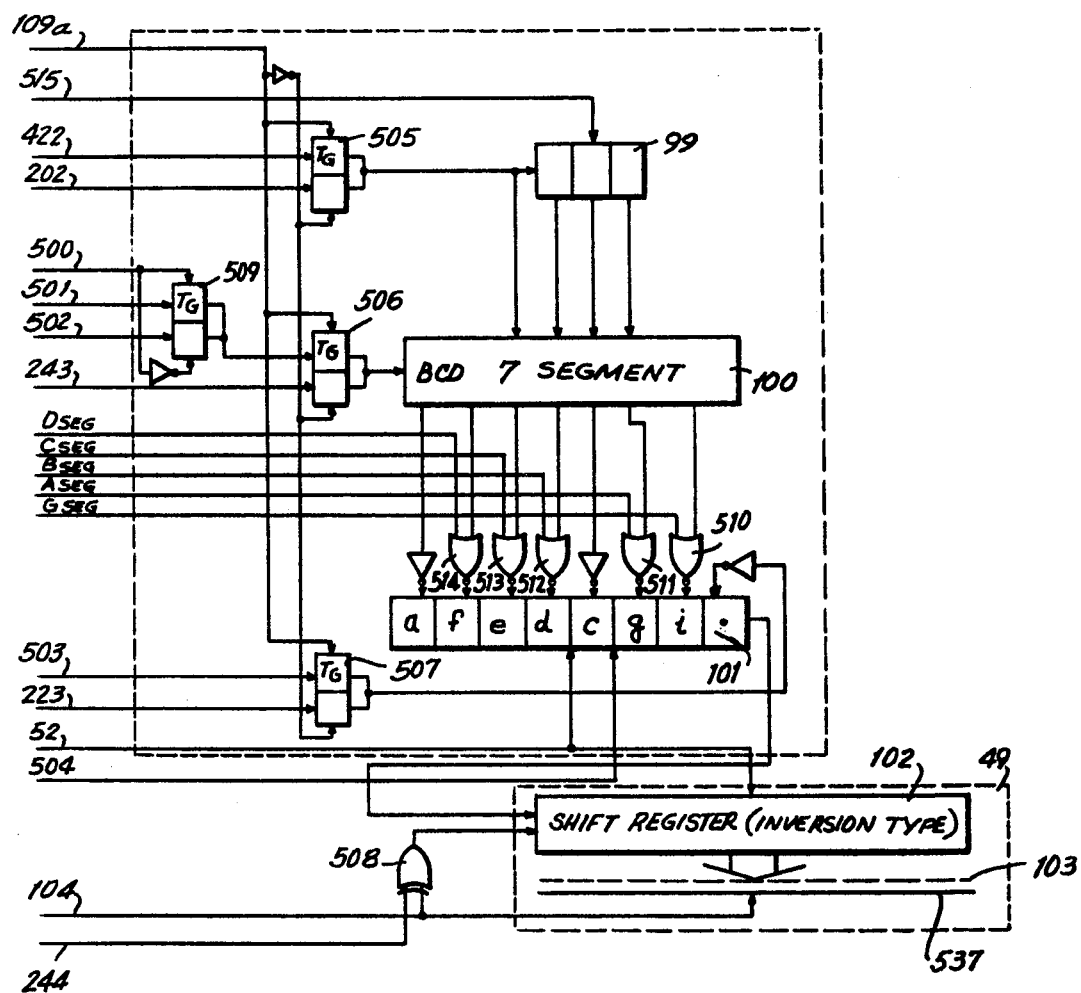
FIG. 16 is a detailed circuit diagram of the decoder circuitry and digital display depicted in FIG. 9.

Reference is now made to FIG. 16, wherein the decoder circuit 48 and digital display 49, constructed in accordance with the instant invention, are depicted. Also, reference will be made to FIGS. 17 and 18, which FIGS. illustrate a half-delay type shift register and an electro-chromic driving circuit, respectively.

In FIG. 16, switching between the time data 422 produced by the timekeeping circuit and the calculating data 202 supplied by the claculating circuit is effected by transmission gate 505. Specifically, the data, either timekeeping or calculating, is loaded in the shift register 99 digit by digit, and is thereafter transferred to the BCD segment transforming decoder 100. Since the decoded segment signal is a bit parallel and digit serial signal, it is transformed into a bit serial and digit serial segment signal by the P/S transforming shift register 101, whereafter the serial information is transferred to the display shift register 102. Shift register 102 is a static type register, with each digit output thereof having a 1:1 correspondence with each segment of the digital display, in order to supply information to the respective display segments. A load signal 504 is applied to the P/S transforming shift register to thereby effect loading of the shift register 102 thereby. When liquid crystals are utilized as the display segments, an alternating drive signal is applied to same for the purpose of extending the life of the display cells. Specifically, LC display cells are formed by display segment electrodes 103 and a common electrode 537, which electrode is adapted to receive AC signal 104 (e.g., 32 Hz). It is noted that in addition to applying the AC signal 104 to the common electrode 537, the AC signal is also applied through EXCLUSIVE-OR gate 508 to the shift register 102 in order to insure that the signals in the display register are inverted in synchronism with the application of the AC signal to the liquid crystal display electrodes. Also, the EXCLUSIVE-OR gate 508 is utilized to invert the AC signal when an error signal 244, which signal is generated when an error occurs during a particular calculation is applied to the EXCLUSIVE-OR gate 508 to thereby effect a simultaneous driving of the segment to produce an [E] display of each of the digits instead of driving the binary number [1] transferred to the display register 102 which is transferred to the display register 102 in the manner discussed above. Stated otherwise, since the circuitry provides a binary [1] reading to the display register 102 when an error condition is detected, if a signal is applied to the shift register to invert the drive signals applied thereto, instead of a "1" digit being displayed, the other five electrodes defining the display digit will be energized and thereby indicate an "E" as being displayed.

The calculator-timekeeping switching signal 109a is applied to transmission gates 505, 506 and 507 to control the information transmitted therethrough. The transmission gate 506 is utilized in combination with the zero-suppress circuitry to transmit the zero-suppress signal 243 when the calculating circuit is performing a calculating operation. Similarly, zero-suppress signals 501 and 502 are transmitted during a timekeeping operation, the zero-suppress signal 501 being utilized to suppress the figures between seconds and minutes, hours and minutes, and after hours, such as the twelve hours figure when hours, minutes and seconds are being displayed. The zero-suppress signal 502 is applied to suppress a digit between date and months and the digits after months when a display of the month and date is effected. The transmission gate 509 is utilized to select either the hour-minute-second signal 501 or the month-date signal 502. Accordingly, the select signal 500 is applied to the transmission gate 509, and the binary state thereof determines whether the signal representative of the hour-minute-second signal 501 or the month-date signal 502 will be transmitted to the transmission gate 506. NOR gates 510 through 514 are input gates for indicating when a function has been selected by the function key F when the wristwatch is in a calculating mode. As is detailed above, with respect to FIG. 11, the function signals are supplied with signal $A_{SEG}$, $B_{SEG}$, $C_{SEG}$ or $D_{SEG}$. NOR gate 514 is provided for separating the display between the seconds digits and minutes digits, minutes digits and hours digits, and also between the date digits and month digits when a timekeeping mode is selected, and the signal $G_{SEG}$ is applied to the gate 514.

Transmission gate 507 is provided for changing the decimal point and is adapted to receive the decimal point signal 223 from the calculator circuit 46 when the calculating circuit is in a calculating mode. Additionally, transmission gate 507 is adapted to receive battery life indicating signal 503 when the wristwatch is in a timekeeping mode, the battery life indicating signal being described hereinafter, in detail with respect to FIG. 19. Specifically, the battery life monitoring signal 503 is produced when the battery voltage falls below a predetermined voltage level representative of the impending failure of the battery, at which time, all of the decimal points in the display are lit and then flickered at one second intervals.

The loading register 99 receives a clock signal 515, four bits of which correspond to one digit, whereas the P/S transforming register 101 and the display register 102 receive a clock signal 52, eight bits of which correspond to a single digit. These clock signals are applied only when the information to be displayed is to be changed. For example, after loading the numerical input date or calculating function data into the respective registers when the wristwatch is in a calculating mode, or when the time changes every second or each day when the wristwatch is in a timekeeping mode and is displaying either present time or month and date information. By limiting the transferring of information in this respect, as in the other circuits discussed above, the power consumption is greatly reduced.

Figure 17A:
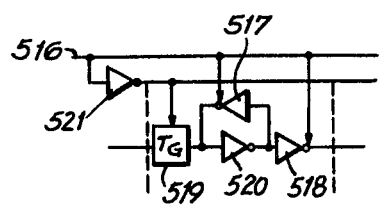
FIGS. 17a and 17b respectively illustrate half-delay type shift registers of the type depicted in FIG. 9.
Figure 17B:
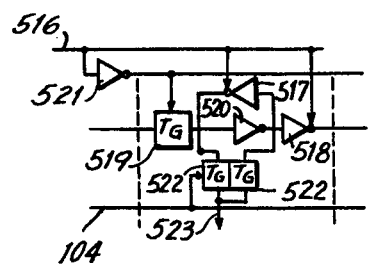

Reference is now made to FIGS. 17a and 17b, wherein the static registers utilized in the electronic wristwatch of the instant invention are depicted. FIG. 17a illustrates a single bit of a half-delay type register. The bit is comprised of inverters 517 and 518, which inverters are controlled by clock signal 516, transmission gate 519 and an inverter 520. The inverters 517 and 520 define a memory circuit and inverter 521 is utilized to invert the clock signal 516 when same is applied to the particular bit of the shift register.

In FIG. 17b, one bit of the display register 102 utilized in the digital display 49 is depicted, as aforenoted. The display register 102 is of the half-delay type. The gates therein correspond in function to the gates in the register illustrated in FIG. 17a and hence like numerals are utilized to denote same. As mentioned above, it is necessary to drive liquid crystal display cells with a AC driving signal in order to extend the life of the display cells, thereby rendering the synchronizing of the segment signal with the AC signal 104 necessary. Transmission gate 522 selects the input and output of the inverter 520, and synchronizes same with the AC signal 104 to obtain an inverted segment signal 523. These half-delay type registers require less elements to form same than conventional master-slave registers, and clearly require less power to operate same.

Figure 18:
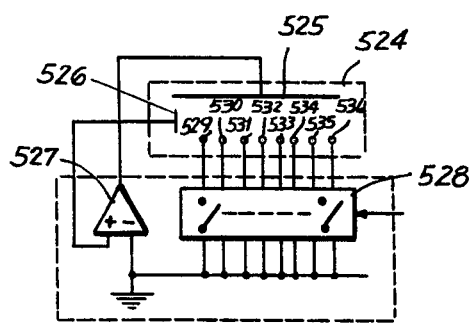
FIG. 18 is a circuit diagram of an electro-chromic digital display driving circuit of the type that could be utilized with the circuitry depicted in FIG. 9.

Reference is also made to FIG. 18, wherein a digital display utilizing electro-chromic display cells is depicted. Electro-chromic segment electrodes 529 through 536 are spaced apart from an opposed electrode 525 and a reference electrode 526. A display function is performed when certain of the segments are selected by decoder 528 and are referenced to ground. At that time, current is applied between the respective segment electrodes and the opposed electrode 525. The reference electrode 526 detects the potential difference between the segment electrodes and feeds back same to an operational amplifier 527, which amplifier controls the voltage of the opposed electrode 525. It is noted however, that electro-chromic display cells require a larger driving current than liquid crystal display cells when the information to be displayed is changed. However, since the display provides a permanent display of the information, the driving current is equivalently reduced. Accordingly, electro-chromic displays can be readily substituted for a LC display in electronic wristwatch of the type to which the instant invention is directed.

Reference is now made to FIG. 19, wherein the battery monitoring circuit 85b depicted in FIG. 9 is illustrated in detail. The battery 538 is a DC cell, and is coupled to a resistor 539, which resistor detects the voltage drop of the battery 538 in a manner to be discussed more fully below. P-channel MOS transistors 541 are provided, with a first P-MOS transistor having the source-drain electrodes thereof coupled in series with detecting resistor 539 to define an output terminal X therebetween. The second stage P-channel transistor 541 is coupled to a N-channel MOS transistor 542 to define an output terminal Y therebetween. The gate electrode of the N-channel transistor 542 is coupled to the output terminal X. The respective gate electrodes of the P-channel transistors 541 are commonly coupled to the decimal point circuit by the lead 540. When the DC battery 538 is operating at a normal voltage level, the voltage at the terminal X is HIGH and the voltage at the terminal Y is LOW. However, as the effective voltage of the supply battery 538 drops, the voltage at the X terminal turns LOW, and the voltage at the Y terminal becomes HIGH, the high state being stored in the memory flip-flop 543. By storing the HIGH signal in the memory flip-flop 543, a battery-life display signal 503 is synchronized with a two second signal 544 at the input to the NAND gate 545. Accordingly, the two second signal is gated by the input from the memory flip-flop 543, and applies a battery monitoring signal 503 to the decimal point circuit, discussed above with respect to FIG. 16, to thereby flicker each of the decimal point digits at a two second interval and provide an indication to the wearer of the wristwatch that the battery must be changed. The clock signal 540 is utilized to reduce the power consumption of the circuit, since the detecting circuit is operated only when the clock signal is applied. Moreover, the detecting circuit is particularly timekeeping and calculator circuits of the type disclosed herein, and also in other IC integrated circuits, since the current consumption of the battery monitoring circuit can often be greater than the current consumption of the timekeeping circuitry, standing alone.

Figure 21:
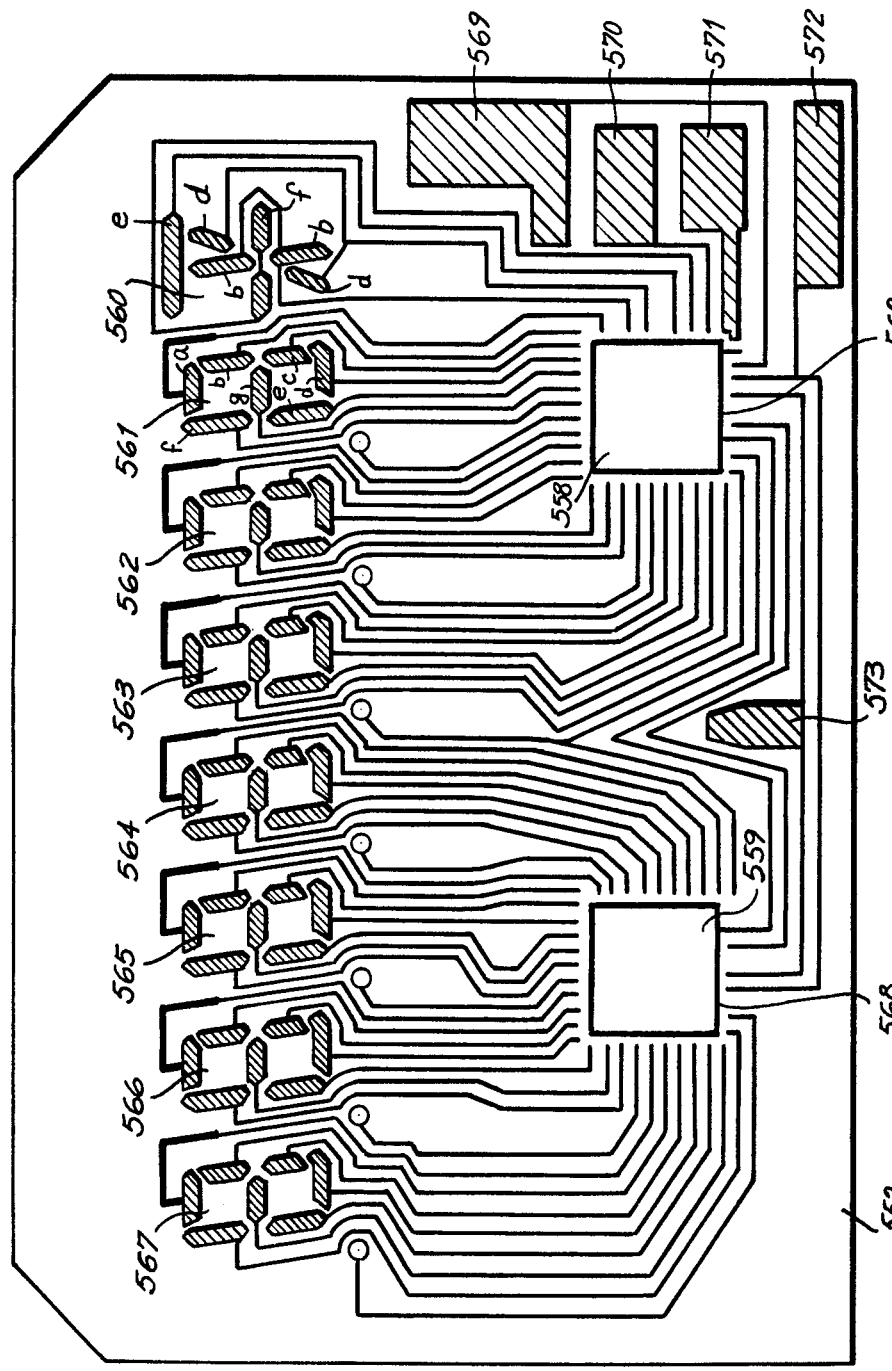
FIG. 21 is a plan view of the digital display, and in particular the electrode configuration thereof, depicted in FIGS. 3 through 6.

Reference is now made to FIGS. 20a, 20b and 20c, wherein the internal modular construction of the electronic wristwatch depicted in FIG. 1 is depicted. FIG. 20a is a plan view of a module, and FIGS. 20b and 20c are side sectional views thereof. Liquid crystal display cell 551 fromed of field-effect type liquid crystals includes an upper glass panel 552, which panel is larger than the numerical display portion 556. The projecting portion of the display panel is provided with two IC chips 558 and 559, which integrated circuit chips are best illustrated in FIG. 21. The display register 102 is divided into two distinct registers, each of which is adapted to store four digits of information, and is integrated in the respective IC chips 558 and 559. It is noted that IC chips 558 and 559 are the same and can be combined but that, as illustrated in FIG. 21, the separating of same facilitates the wiring of the display module.

As is illustrated in FIG. 21, the glass panel 552 is provided with transparent electrodes in the form of display segments, the respective display segments being coupled through leads to the display registers formed in IC chips 558 and 559. The group of electrodes, generally indicated as 560 represent the function display digit 4 illustrated in FIG. 1. The group of electrodes respectively indicated as 561 through 567 are seven-segment electrodes for indicating numerals, and include an eighth electrode for providing a decimal point, each of the segment electrodes being coupled to one of the two IC chips 558 and 559. The IC chips 558 and 559 are die bonded on gold electrodes 568 formed on the upper glass panel 552 and are wire bonded to the terminals of the electrode leads. It is preferred that at least a portion of the respective electrode leads adjacent to IC 558 or IC 559 be formed of gold electrodes, though a considerable part of the respective electrode leads may be formed of transparent electrodes. Connecting terminals 569 through 573 are respectively coupled to IC 559 and IC 558 and couple the circuitry therein to the remaining circuitry in the electronic wristwatch. It is noted that the respective connecting terminals 569, 571, 572 and 573 are the 32 Hz terminal, positive power terminal, data input terminal, clock signal terminal and negative power terminal, respectively.

Each of the IC chips 558 and 559 has forty bonding pads, which bonding pads are specifically illustrated in FIG. 22. Bonding pad nos. 1 through 32 are for bit output terminals, each of which correspond to a single display segment. Pad numbers 33 and 37 are for the 32 Hz terminals. Pad numbers 34 and 36 operate as clock signal terminals. Pad number 35 provides a negative power terminal and pad number 38 provides a positive power terminal. Finally, pad number 39 provides a data input terminal. The bonding pads are characterized by providing two pads for the 32 Hz terminals and two pads for the clock signal terminals so that the respective electrode leads of the connecting terminals 569 through 573, illustrated in FIG. 21, can be formed in a single layer, thereby avoiding multi-layer connections, and hence minimizing the cost of packaging the modules.

The table below illustrates the connection between the pads of the display register IC 558 and 559, the display segments and the connecting terminals 569 through 573. By way of explanation, 1-a, 1-b, etc., are segments a, b, etc., of the seven-segment electrode 561 for indicating numerals, such as a, b, etc., and are marked to each segment of a seven-segment electrode in the usual manner depicted in FIG. 21. Numerals 2-a, 2-b, etc., correspond to the seven-segment electrode 562 for indicating numerals and the same applies to 3-a, 3-b, . . . , and 4-a, 4-b, . . . With respect to the four groups of segments in the function display digit, represented by the group of electrodes 560, F-f, F-e, . . . are designated as the segments illustrated in FIG. 21. The respective display register ICs 558 and 559 are represented by the letters A and B in the table.

| IC Pad No. | A | B | IC Pad No. | A | B |
|---|---|---|---|---|---|
| 1 |  | 4-a | 21 | 2-c | 6-c |
| 2 | F-f | 4-f | 22 | 2-g | 6-g |
| 3 | F-e | 4-e | 23 | 2-b | 6-b |
| 4 | F-d | 4-d | 24 | 2-. | 6-. |
| 5 |  | 4-c | 25 | 3-a | 7-a |
| 6 |  | 4-g | 26 | 3-f | 7-f |
| 7 | F-b | 4-b | 27 | 3-e | 7-e |
| 8 |  | 4-. | 28 | 3-b | 7-b |
| 9 | 1-a | 5-a | 29 | 3-c | 7-c |
| 10 | 1-f | 5-f | 30 | 3-g | 7-g |
| 11 | 1-e | 5-e | 31 | 3-b | 7-b |
| 12 | 1-d | 5-d | 31 | 3-. | 7-. |
| 13 | 1-c | 5-c | 33 | connected to pad B-39, connected to 32 Hz, B-37 | unconnected |
| 14 | 1-g | 5-g | 34 | unconnected | clock signal |
| 15 | 1-b | 5-b | 35 | negative power | negative power |
| 16 | 1-. | 5-. | 36 | clock signal | unconnected |
| 17 | 2-a | 6-a | 37 | 32 Hz | connected to 32 Hz, A-33 |
| 18 | 2-f | 6-f | 38 | positivie power | positive plus power |
| 19 | 2-e | 6-e | 39 | data input | connected to pad A-32 |
| 20 | 2-d | 6-d |  |  |  |

By providing the display register circuits on the liquid crystal display panel in the aforedescribed manner, the reliability of the display module is improved. Specifically, when sudden shocks occur, such a configuration provides greater shock resistance and hence, long term reliability to the connections between the (61) electrodes required to comprise the seven-segment digital display and the coupling of same to the respective display registers for driving same. The number 61 is arrived at by counting seven segment electrodes plus a decimal point for each display digit, and adding-in the electrodes for the function display digit which is comprised of four distinct groups of electrodes, and one common electrode ($8 \times 7 + 4 + 1 = 61$). By the connection described above, instead of requiring the connection of 61 segement electrodes to an exterior circuit, only five connections, representative of the five connecting terminals, need be made, thereby clearly increasing the reliability of such a display panel. In addition, although such a construction increases the size of the display panel, the increase in the display panel is utilized to good advantage in assembling the respective modules in the manner depicted in FIGS. 20a through 20c.

Turning again to FIG. 20, the base plate 574 is injection molded in order to receive each of the components of the module. An LSI chip 575 comprising the entire electronic circuit depicted in FIG. 9 with the exception of the display register, which register is disposed on the display panel in the manner depicted in FIG. 21, and a few additional external attachments. The LSI chip 575 is die-bonded on a lead frame 776, which frame is secured to the base plate 574 by a pin 577 and is wire bonded to the required terminal in the manner illustrated in FIG. 20a. Thereafter, LSI chip 575 and the wire bonded portion thereof are molded (not shown). The quartz crystal vibrator 578 is disposed on the base plate 574, the subminiaturized quartz crystal vibrator being manufactured by etching a thin quartz crystal plate, in order to simplify the configuration of the module and reduce the size thereof. As aforenoted, the instant invention is not limited to quartz crystal vibrators and that the vibrator may be replaced by vibrators manufactured in other manners or even by vibrators formed of materials other than quartz, such as lithium tantalate. Terminals 579 and 580 of the vibrator are connected to oscillator circuit terminals 581 and 582, which terminals are coupled to the LSI chip 575 through the terminals of the lead frame. Additionally, terminals 581 and 582 are coupled to an adjusting trimmer capacitor 583 and a chip capacitor 584 for permitting the high frequency time standard signal produced by the oscillator circuit to be tuned.

Terminals 624 through 628 correspond to the connecting terminals 569 through 573 of the liquid crystal display panel 551, illustrated in detail in FIG. 21. Specifically, terminals 624, 625, 626, 627 and 628 are the 32 Hz terminals, pulse power terminals, data input terminals, clock signal terminals, and negative power terminals, respectively. Terminals 624 through 628 are secured to the lead terminal of the lead frame 576 and are connected to the respective terminals 569 through 573 of the upper glass panel 552 through a pin 589, which pin projects through the base plate. The electrical and mechanical connections described above permit the display panel 551 to be secured to the base plate 574 and are best effected by utilizing an anisotropic conductive adhesive.

Anisotropic conductive adhesives are made by mixing conductive particles such as Ag, Ni, solder and the like of appropriate size into an adhesive having a strong adhesion characteristic such as epoxy or the like. When the display panel 551 is forceably secured to the base plate 574 by such an anisotropic conductive adhesive, electrical conductivity in a direction perpendicular to the surfaces, coupled with insulation in a direction parallel thereto, is provided. By such an arrangement, the terminals 624 through 628 coupled to the LSI chip 575 are connected to the terminals 569 through 573 on the upper glass panel through the anisotropic conductive adhesive, and in the same process by which the electrical connection is formed, the display panel 551 is mechanically secured to the base plate 574. Accordingly, no further methods for securing the display panel to the circuitry is required, providing an improved module construction.

The DC supply battery 590 is disposed in a recessed portion 595 of the base plate 574. The position of the battery is particularly characterized by same being disposed in non-overlapping relationship with the display panel 551 and the remaining components illustrated in plan view in FIG. 20a. By providing such an arrangement, the supply battery 590 may be almost as thick as the module and have as large a battery capacitance as possible in the module. State otherwise, since the battery does not overlap with the remaining components of the electronic wristwatch, the watch module is no thicker than the battery and hence can be limited to five mm or less, thereby providing an extremely thin electronic wristwatch. Moreover, even if the thickness of the wristwatch is not critical, by utilizing the non-overlapping relationship detailed above, a thickness of 5.5 mm is readily realized, which thickness is thiner than most conventional electronic wristwatches that do not have calculator circuitry. Thus, the instant invention is characterized by an electronic wristwatch that is capable of operating in a timekeeping mode and a calculating mode and yet is sized to comfortably fit on a person's wrist. Additionally, the battery holder 591 is coupled to the positive power terminal 592 and secures the power supply 590 in the module. The negative terminal 593 is disposed on the opposite side of the battery and provides a negative terminal for coupling the power supply through a pin 594 to the LSI chip 575. Terminals 596 through 607 are connected to the keyboard 5 illustrated in FIG. 1. Specifically, terminals 596 through 607 are respectively connected to keys [7S],[8−],[9+],[C],[4T] ,[5÷],[6×],[F],[1 MD],[2 1/X],[3 =] and [0.], respectively. These terminals are fed through to the rear side of the base plate depicted in FIG. 20a through pins projecting through the base plate in the same manner as the terminal 624 through 628 connected to the display panel 551 so that the lead terminals can be secured to the base plate 574 to thereby facilitate the manner in which the keys are coupled thereto.

The stem 608 is coupled to the crown 6 illustrated in FIG. 1. A stem positioning member 609 having two resilient arms 621 is provided for stem 608 to thereby apply a force to lift the stem 608 through an aperture 620 in the member 609 in which the stem 608 is inserted. A groove 610 formed in the stem 608 effects a positioning of the stem 608 in the positioning member 609. When the crown 6 is pulled out, the stem 608 is pulled out, thereby permitting positioning member 609 to ride over the first groove 610 of the stem and be displaced in a second groove 611 formed in the stem. Alternatively, when the crown 6 is pushed in, the positioning member 609 is cammed along slope 612 of the stem 608. If the pushing force is released, the positioining member 609 rides down the slope 612 and once again returns to a position in the first groove 610. The stem is supported by a holding member 613. A switch lever 614 is engaged with the stem 608 at the innermost end portion thereof and is operated in response to movement of the stem. When the stem 608 is at a rest position with its first groove 610 being engaged by the positioning member 609, the switching lever 614 applies a pushing force through its resilient tail portion 616 to thereby resiliently bias the stem 608 toward the outside of the module. At such a position, the contact tail portion 617 is located at a neutral position out of contact with the change switch pin 618 or time correction unlock pin 619. When stem 608 is pushed in, switch lever 614 is rotated about pivot 615 to thereby displace the contact tail portion 616 in contact with the change switch pin 618. Alternatively, when the stem 608 is pulled out, the contact tail portion 617 engages the time correction unlock pin 619. Thus, when reference is made to the operation of the electronic wristwatch depicted in FIG. 1, it is appreciated that each time the crown is pushed in, the contact tail portion 617 of the switch lever 614 is contacted to thereby change the wristwatch between a timekeeping mode and a calculating mode in a cyclical manner. Similarly, when the crown is pulled out, the contact tail portion 617 engages the time correction unlock pin 619 to place the electronic timepiece circuitry in a time correction mode. Lamp 622 is provided proximate to the liquid crystal display in order to permit the liquid crystal display to be read in the dark. A bipolar transistor 623 is coupled to the lamp in order to provide sufficient current to effect driving of same.

It is noted that the instant invention is not limited to the module construction detailed above. For example, the stem 608 and the switch structure attached thereto can readily be changed. Similarly, LSI chip 575 can be bonded to the lead frame by die bonding and wire bonding initially, then molded, and then coupled to the base plate 574. Alternatively, LSI chip 575 may be bonded on a thin printed board such as a film-like printed circuit board. Additionally, instead of wire bonding, face-down bonding can be utilized.

Accordingly, the instant invention, as characterized by the aforedescribed embodiments is characterized by an electronic wristwatch wherein the timekeeping function and calculating function is optimized. Specifically, not only with respect to the circuitry, but additionally with respect to the mechanical features of the electronic wristwatch, the keyboard, other like structure, as well as the timekeeping circuitry and calculator circuitry are utilized together. Secondly, the power consumption is considerably reduced by utilizing static registers, improving the control effected by the ROM and utilizing certain circuit construction techniques, thereby limiting maximum power consumption to 15 $\mu$A for a power supply on the order of 1.5 V. Similarly, error free operation is provided by providing a keyboard wherein the number of keys are reduced and the overlapping condition whereby more than one key is inadvertently actuated is minimized by the overlapping prevent circuitry. Moreover, since the keyboard is formed of touch sensitive contact that utilizes a human's skin resistance to actuate the same, no moveable parts are required, thereby improving the reliability of the timepiece by rendering same shock resistant, etc. Moreover, the modular construction of the instant invention is such that calculator circuitry can be included in the electronic wristwatch without increasing the thickness of the wristwatch so that the entire wristwatch can be sized equal to or even smaller than a conventional electronic wristwatch. Finally, such functions as alarm, multi-time display and additionally, use of the wristwatch as a stop watch can be provided with little change in the circuitry being required.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An electronic wristwatch comprising, in combination, timing pulse generating means for producing a plurality of time standard signals, timekeeping circuit means coupled to said timing pulse generating means for receiving at least one of said time standard signals, and in response thereto producing timekeeping signals representative of actual time, calculator circuit means coupled to said pulse generating means for receiving at least two of said time standard signals produced by said timing pulse generating means and in response thereto, producing calculating signals representative of calculations performed thereby, digital display means for receiving said timekeeping signals and said calculating signals, said digital display means being adapted to display actual time in response to said timekeeping signals and numerical information representative of said calculations performed by said calculating circuitry in response to said calculating signals, input means adapted to receive at least one of said time standard signals produced by said timing pulse generating means, said input means being adapted to produce functional signals and numerical information signals, said calculating circuit means being adapted to receive said numerical information signals and function signals and in response thereto, produce calculating signals representative of the numerical information and calculating functions, said calculator circuit means including numerical information calculating means for receiving said numerical information signals and programmable control means for receiving said function signals and in rsponse thereto controlling the calculations performed by said calculating means on said numerical information represented by said numerical information signals applied thereto, so that said calculating means produces signals representative of said numerical information and calculating functions performed thereby, said calculating means further including a plurality of bit-serial register means for storing and processing numerical information in response to said numerical information signals being applied thereto, at least one of said bit-serial register means in said calculator means being coupled to said timekeeping circuit means for storing and processing timekeeping information therein, said timekeeping circuit means including at least one bit-serial timekeeping register means for storing and processing information representative of actual time, said timekeeping signal being a bit-serial signal, said calculator bit-serial register means being adapted to store and transfer said numerical information and calculating signals produced thereby in bit-serial form.

2. An electronic wristwatch as claimed in claim 1, wherein said timekeeping circuit means includes bit-serial register means and selecting means, said selecting means being coupled to said programmable control means, said selecting means being adapted to selectively apply to said register means in said timekeeping circuit means numerical information stored in said calculating circuit register means, said numerical information being utilized to correct the count of said timekeeping signal in said timekeeping circuit register means to the count of said numerical information stored in said calculating circuit register means.

3. An electronic wristwatch as claimed in claim 1, and including alarm circuit means coupled to at least one of said bit-serial calculating register means, said alarm circuit means being further coupled to said timekeeping circuit means, said alarm circuit means including comparator means for comparing the count of said numerical information stored in said calculating circuit register means with the count of said timekeeping signal, and in response to the respective counts of said calculating means and timekeeping means being coincident, said comparator means being adapted to produce an alarm signal.

4. An electronic wristwatch as claimed in claim 1, wherein said digital display means includes display circuit means and decoder means, said decoder means being adapted to receive said timekeeping signals and said calculating signals and transform same into display digit signals, said display circuit means including a plurality of electrode means defining a plurality of display digits, and display register means coupled to said decoder means for receiving said display digit signals and in response thereto, energizing said plurality of electrode means comprising said display digits.

5. An electronic wristwatch as claimed in claim 4, wherein said display register means is a serial register for storing and transferring one of said timekeeping signals and calculating signals in serial form to said display digit electrodes to energize same, said decoder means being adapted to process said calculating signals and timekeeping signals received thereby and transfer said serial signals into said display register means.

6. An electronic wristwatch as claimed in claim 4, wherein said decoder means includes selector means for receiving said timekeeping signals and calculating signals, said selecting means being adapted to apply one of said timekeeping signals and calculating signals to said display register means to thereby select between the display of actual time or calculating information.

7. An electronic wristwatch as claimed in claim 1, wherein said display means includes at least one display register for receiving one of said calculating signals and timekeeping signals, and in response thereto, being adapted to store and transfer said signals in bit-serial form to effect a digital display.

8. An electronic wristwatch as claimed in claim 7, and including decoder means coupled intermediate said bit-serial display register means and said programmable control means and said timekeeping circuit means, said decoder means being adapted to transfer one of said bit-serial timekeeping signals, stored in said timekeeping register means, and bit-serial calculating signals stored in said calculating circuit register means, applied thereto, to said bit-serial display register means, only when binary count of the bit-serial calculating signals or bit-serial timekeeping signals applied thereto is changed.

9. An electronic wristwatch as claimed in claim 1, wherein said digital display means includes decoder circuit means for receiving and decoding one of said timekeeping signals and calculating signals, a display register for receiving said decoded signals and at least seven display digits adapted to be driven by said decoded signals received by said display register.

10. An electronic wristwatch as claimed in claim 9, wherein said display digits are formed in a seven bar display, for effecting display of the numerical information in said calculating circuit means.

11. An electronic wristwatch as claimed in claim 1, wherein each said input means, timing pulse generating means, calculating circuit means and timekeeping circuit means is integrated into the same LSI chip.

12. An electronic wristwatch as claimed in claim 1, wherein said calculating circuit register means and timekeeping circuit register means are static registers.

13. An electronic wristwatch as claimed in claim 1, wherein said programmable control means is an ROM having a plurality of addresses, said ROM being coupled to said calculator register means for transforming the contents stored therein in a step-by-step programmed order as determined by the address in the ROM.

14. An electronic wristwatch as claimed in claim 13, wherein said ROM includes latching means for retaining the contents of the selected address during each function operation performed/by said calculating circuit means.

15. An electronic wristwatch as claimed in claim 14, wherein said selected address is selected in response to said function signal being applied to said ROM.

16. An electronic wristwatch as claimed in claim 15, wherein said calculator circuit means includes judging circuit means for detecting the state of said calculator register means, said ROM including address jumping means for changing the selected address in response to said judging circuit means detecting a predetermined state of said register means.

17. An electronic wristwatch as claimed in claim 1, wherein said timing pulse generating means includes an oscillator circuit for producing high frequency time standard signals having a frequency of $2^n$, where $n$ is a positive integer, and counter-divider means for having a division ratio of $1/K$, where K is a positive integer greater than 2, for dividing said high frequency time standard signal, and correction means coupled to said counter-divider means for receiving said divided output signal produced thereby and in response thereto producing a low frequency signal having a frequency of $2^m$, where $m$ is an integer less than $2^n/K$.

18. An electronic wristwatch as claimed in claim 1, and including a supply battery coupled to said input means, timing pulse generating means, calculator means and timekeeping circuit means, and supply battery monitoring means coupled to said supply battery for detecting a predetermined drop in voltage delivered thereby, said battery circuit means coupled to said digital display means for lighting same in response to detecting a predetermined drop in the voltage delivered by said supply battery.

19. An electronic wristwatch as claimed in claim 18, wherein said battery monitoring circuit means includes an output gate, said output gate having a time standard signal applied as a first input thereto, said output gate in response to said predetermined drop in potential being adapted to apply the time standard signal to the digital display means to flicker the digital display means in response to said time standard signal being applied thereto.

20. An electronic wristwatch as claimed in claim 1, wherein said timing pulse generating means includes an oscillator circuit for producing a high frequency time standard signal, said high frequency time standard signal having a frequency equal to $2^n$, where $n$ is a positive integer.

21. An electronic wristwatch as claimed in claim 20, wherein said time standard of said oscillator circuit is a flexural mode quartz crystal vibrator.

22. An electronic wristwatch as claimed in claim 20, wherein said time standard of said oscillator circuit is adapted to produce a high frequency time standard signal in the range of 20 K Hz to 600 K Hz.

23. An electronic wristwatch as claimed in claim 20, wherein said time standard of said oscillator circuit is a longitudinal vibrator.

24. An electronic wristwatch as claimed in claim 20, wherein said time standard of said oscillator circuit is a lithium tantalite vibrator.

25. An electronic wristwatch comprising, in combination, timing pulse generating means for producing a plurality of time standard signals, timekeeping circuit means coupled to said timing pulse generating means for receiving at least one of said time standard signals, and in response thereto producing timekeeping signals representative of actual time, calculator circuit means coupled to said pulse generating means for receiving at least two of said time standard signals produced by said timing pulse generating means and in response thereto producing calculating signals representative of calculations performed thereby, digital display means for receiving said timekeeping signals and said calculating signals, said digital display means being adapted to display actual time in response to said timekeeping signals and numerical information representative of said calculations performed by said calculating circuitry in response to said calculating signals, manually operated input means adapted to receive at least one of said time standard signals produced by said timing pulse generating means, said input means being adapted to produce functional signals and numerical information signals, said calculating circuit means being adapted to receive said numerical information signals and function signals and in response thereto produce calculating signals representative of the numerical information and calculating function, said manually operated input means including a plurality of touch sensitive contact means, each of said touch sensitive contact means being adapted to apply at least one of a function signal and numerical information signal to said calculating circuit means, each of said touch sensitive contact means including a contact plate and a resistive element for connecting said contact plate to ground through the skin resistance of the user upon engagement thereof by the user to produce one of said numerical information signals and function signals thereby, detector circuit means disposed intermediate each said contact plate and said calculator circuit means, and multiple input prevention circuit means for receiving the outputs of said detector circuit means and in response to receiving overlapping signals in response to more than one contact plate being referenced to ground, selectively transmitting only the first of said overlapping signals to said calculator circuit means.

26. An electronic wristwatch as claimed in claim 23, wherein said detector circuit means includes at least one input stage formed of MOS transistors.

27. An electronic wristwatch as claimed in claim 26, wherein said input stage comprises an inverter formed of C-MOS transistors.

28. An electronic wristwatch as claimed in claim 27, wherein each said touch sensitive contact means resistive element is selected to have a value substantially greater than the value of the average skin resistance of the user.

29. An electronic wristwatch as claimed in claim 28, wherein said manually operated input means includes chatter eliminating circuit means coupled to the output of each inverter stage for removing the effect of chatter from the signals produced by the respective contacts.

30. An electronic wristwatch as claimed in claim 25, wherein at least ten contact plates are provided for producing numerical information signals, and at least one further contact plate is provided for converting the signals produced by at least two of said ten contact plates to function signals.

31. An electronic wristwatch comprising, in combination, timing pulse generating means for producing a plurality of time standard signals, timekeeping circuit means coupled to said timing pulse generating means for receiving at least one of said time standard signals, and in response thereto producing timekeeping signals representative of actual time, calculator circuit means coupled to said pulse generating means for receiving at least two of said time standard signals produced by said timing pulse generating means and in response thereto, producing calculating signals representative of calculations performed thereby, digital display means for receiving said timekeeping signals and said calculating signals, said digital display means being adapted to display actual time in response to said timekeeping signals and numerical information representative of said calculations performed by said calculating circuity in response to said calculating signals, input means adapted to receive at least one of said time standard signals produced by said timing pulse generating means, said input means being adapted to produce functional signals and numerical information signals, said calculating circuit means being adapted to receive said numerical information signals and function signals and in response thereto, produce calculating signals representative of the numerical information and calculating functions, said calculator circuit means including numerical information calculating means for receiving said numerical information signals and programmable control means for receiving said function signals and in response thereto controlling the calculations performed by said calculating means on said numerical information represented by said numerical information signals applied thereto, so that said calculating means produces signals representative of said numerical information and calculating functions performed thereby, said digital display means including decoder circuit means for receiving and decoding one of said timekeeping signals and said calculator signals, display register means for receiving said decoded signals and a plurality of numerical display digits coupled to said display register means, said display digits being energized to display numerical information in response to said display registers receiving decoded signals, and a function display digit means coupled to said decoder means, said function display digit means being adapted to display the particular function performed by said calculating circuit means in response to said display register means receiving a decoded calculating signal produced when the function signals are applied to said programmable control means.

32. An electronic wristwatch as claimed in claim 31, wherein said function display digit includes a six segmented digit configured in the manner illustrated in FIG. 2a of the drawings.

33. An electronic wristwatch as claimed in claim 31, wherein said display register means are integrated into at least one circuit chip, said numerical and functional display digits being comprised of LC display digits, and said circuit chip having said display register means thereon and electrodes formed on a display panel for defining said numerical and functional display digits, each of said electrodes being disposed on the same display panel.

34. An electronic wristwatch as claimed in claim 31, wherein said numerical display digits are seven-segment display digits.

35. An electronic wristwatch as claimed in claim 34, wherein said calculator circuit means includes error detecting means for detecting an error in calculations preformed thereby and in response thereto applying an error signal to said display register means for energizing said numerical display digits, said error display signal having a binary count for energizing the respective seven-segment display digits to display the number (1), said decoder means including inverter means for inverting said error signal applied to said numerical display digits to thereby effect a display of the letter E thereby.

36. An electronic wristwatch as claimed in claim 31, wherein said display register means is integrated into at least one circuit chip, said numerical and functional display digits being comprised of electro-chromic display digits, said circuit chip having said display register means thereon and said electrodes defining said numerical and functional display digits being disposed on the same display panel.

37. An electronic wristwatch as claimed in claim 36, and including a battery for energizing said timing pulse generating means, input means, calculator circuit means, timekeeping circuit means and said digital display means, said numerical and functional display digits being positioned out of overlapping relationship with said battery in plan view, to reduce the thickness of said wristwatch.

* * * * *